(12) United States Patent
Murata et al.

(10) Patent No.: US 7,782,638 B2
(45) Date of Patent: Aug. 24, 2010

(54) SWITCHING POWER SUPPLY DEVICE, SEMICONDUCTOR DEVICE, AND CONTROL METHOD

(75) Inventors: Kazuhiro Murata, Osaka (JP); Tetsuji Yamashita, Kyoto (JP); Yoshihiro Mori, Kyoto (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 11/525,716

(22) Filed: Sep. 22, 2006

(65) Prior Publication Data
US 2007/0064358 A1   Mar. 22, 2007

(30) Foreign Application Priority Data
Sep. 22, 2005   (JP) ............... 2005-275284

(51) Int. Cl.
*H02H 7/12* (2006.01)
(52) U.S. Cl. ............... 363/56.11; 363/21.15; 363/21.16
(58) Field of Classification Search .............. 363/21.16, 363/21.15, 56.11, 21.08, 21.07, 56.09, 56.1, 363/56.03, 56.08; 361/18
See application file for complete search history.

(56) References Cited

U.S. PATENT DOCUMENTS

| | | | |
|---|---|---|---|
| 5,412,556 A | 5/1995 | Marinus | |
| 5,640,312 A | 6/1997 | Carroll | |
| 5,818,670 A | 10/1998 | Ahn | |
| 5,914,865 A | 6/1999 | Barbehenn et al. | |
| 6,005,789 A | 12/1999 | Lee | |
| 6,088,244 A * | 7/2000 | Shioya et al. | 363/21.07 |
| 6,094,362 A * | 7/2000 | Domingo | 363/56.1 |
| 6,532,159 B2 * | 3/2003 | Nishida et al. | 363/21.16 |
| 6,879,501 B2 * | 4/2005 | Mori | 363/56.03 |
| 2004/0208024 A1 * | 10/2004 | Nagano et al. | 363/19 |

FOREIGN PATENT DOCUMENTS

| | | |
|---|---|---|
| JP | 5 068330 | 3/1993 |
| JP | 6 153382 | 5/1994 |

\* cited by examiner

*Primary Examiner*—Harry Behm
(74) *Attorney, Agent, or Firm*—RatnerPrestia

(57) ABSTRACT

A plurality of arrangements for detecting an overload of energy supplied to an output part enables selecting latch-off or auto-recovery overload protection by the operation of a switching device. When the drain current peak of the switching device exceeds a predetermined level denoting an overload, the FB pin voltage also rises to latch off, and when the drain current peak then reaches a maximum level, the CC pin voltage drops to a predetermined level and limits the oscillation period of the switching device because output power cannot be increased even if the load increases further. Latch-off overload protection can be applied when the drain current peak exceeding a predetermined level is detected, and auto-recovery overload protection can be applied when the CC pin voltage is detected to drop to a predetermined level.

12 Claims, 13 Drawing Sheets

SWITCHING POWER SUPPLY DEVICE, SEMICONDUCTOR DEVICE, AND CONTROL METHOD

BACKGROUND OF THE INVENTION

1. Field of Invention

The present invention relates to technology for a switching power supply and peripheral circuitry for a switching power supply, and relates more particularly to technology for a switching power supply device, a semiconductor device, and a control method for a switching power supply device.

2. Description of Related Art

Switching power supply devices conventionally require an overload protection function in order to prevent high current output in the event a shorted load or other load problem causes an output voltage drop, and to prevent current exceeding a predetermined level from accidentally flowing to an electronic device load. Numerous designs affording such an overload protection function are known from the literature.

Providing an overload protection function requires solving two problems, (1) how to detect an overload state, and (2) how to provide protection, and various designs of solving these problems are known from the literature.

There are three ways of detecting an overload as described below with reference to FIG. 12.

The switching power supply shown in FIG. 12 includes a switching device 201, a control circuit 202 that has CC, FB, and GND pins and controls the switching device 201, and a transformer 231, and detects the output voltage VO by resistances 246 and 247, shunt regulator 245, and photocoupler 232. This switching power supply changes the current flow from the FB pin of the control circuit 202 based on the output voltage VO, and switching device 201 and the first coil 231a of the transformer 231 adjust the energy supplied to the output. The switching power supply shown in FIG. 12 is a common rated voltage supply device. The secondary coil 231b and auxiliary coil 231c of the transformer 231 have the same polarity, and the auxiliary supply voltage VCC of the CC pin that is smoothed by diode 204 and capacitor 205 is ideally proportional to the output voltage VO. The CC pin is also commonly used to supply power to the control circuit 202 during normal operation.

A first arrangement for (1) detecting an overload state monitors the energy supplied by the switching device 201 and transformer 231 to the output and detects an overload when the supplied energy exceeds a predetermined level. More specifically, an overload is detected when the peak current flow through the switching device 201 reaches a predetermined level. PWM (pulse width modulation) control and ringing choke converter control methods determine the output power by controlling the time current flows to the switching device 201. This output power increases linearly to the peak level of current flowing through the switching device 201, and this can be used to detect an overload state when the output power and output current IO exceed a predetermined level.

A second arrangement uses the auxiliary supply voltage VCC that is smoothed and generated proportionally to the output voltage VO by the secondary coil 231b and auxiliary coil 231c of the same polarity. An overload is detected when the auxiliary supply voltage VCC drops below a predetermined level. The maximum energy level supplied to the output is determined by setting the peak current flow through the switching device 201 with PWM control, for example, and by setting the maximum oscillation frequency with PFM control. Because the auxiliary supply voltage VCC drops as the output voltage VO drops as the load increases further, the auxiliary supply voltage VCC output from the CC pin can be used to detect an overload when the output current IO exceeds a predetermined level.

A third arrangement likewise uses the secondary coil 231b and auxiliary coil 231c of the same polarity to detect an overload when the auxiliary supply voltage VCC exceeds a predetermined level. As noted above, the auxiliary supply voltage VCC is ideally proportional to the output voltage VO. As the load increases, the energy supplied from the secondary coil 231b to the load increases, and the output power increases. However, because the power consumed by the control circuit 202 at the CC pin is substantially constant, the energy supplied from the auxiliary coil 231c to the control circuit 202 is also constant. As a result, the auxiliary supply voltage VCC tends to rises as the load increases. Using this increase in the auxiliary supply voltage VCC, an overload is detected when the output power and output current IO exceed a predetermined level.

There are generally two types of arrangements for (2) providing protection, latch off and auto-recovery. Latch-off methods stop the switching operation (referred to below as "oscillation") of the switching device when an overload is detected and prevents the switching device from oscillating until the input voltage drops. Self-resetting arrangements enable the power supply to operate normally again once the overload state is cleared after an overload is detected and the protection circuit operates.

One type of auto-recovery arrangement is the foldback current limiting circuit that reduces energy supply to the output as the output voltage VO drops when an overload is detected so that the output current IO drops as the output voltage drops indicated by the output voltage-output current (V-I) curve shown in FIG. 13A.

A second auto-recovery arrangement is the simple current limiting circuit having the output voltage-output current (V-I) curve shown in FIG. 13B, that is, the output current IO remains constant while the output voltage drops at a certain threshold current.

A third auto-recovery arrangement is the intermittent timer switching circuit that reduces the oscillation period of the switching device at a constant rate when an overload is detected to increase the time oscillation is off and reduce the energy supply to the output.

Japanese Unexamined Patent Appl. Pub. H5-68330, for example, teaches an auto-recovery overload protection device that detects an overload from a drop in the smoothed voltage of the auxiliary coil and limits current output.

Japanese Unexamined Patent Appl. Pub. H6-153382 teaches a latch off overload protection device that detects an overload when current flow to the switching device exceeds a predetermined level.

In switching power supplies the control circuit controlling the switching device is often provided on a semiconductor substrate, or the switching device and the switching device control circuit are provided on the same semiconductor substrate. These semiconductor devices are sold as a control IC for a switching power supply, and make it easier to design a switching power supply.

As noted above, both latch off and auto-recovery designs can be used for overload protection. However, while one power supply device may require latch-off overload protection in order to assure a safe shutdown when an overload occurs, other power supply devices require auto-recovery protection enabling the power supply to restart automatically when the overload state is resolved after the overload protection operates when an overload is detected. Both types of overload protection have their advantages and disadvantages depending upon the devices connected to the power supply output and the operating environment.

However, only one type of overload protection is rendered on this type of switching power supply control IC, and when a control IC (semiconductor device) is used when designing a switching power supply, the type of overload protection cannot be selected. The utility of the control IC is thus diminished.

The present invention solves this problem by rendering a plurality of arrangements for detecting an overload state, such as an arrangement for detecting when the energy supplied to the output through a transformer is greater than or equal to a predetermined level and an arrangement for detecting when the smoothed voltage from the secondary coil of the transformer and the auxiliary coil of the same polarity drops, and operating a switching device to select one of the arrangements. Latch off overload protection is applied when one of these detection arrangements detects an overload, and auto-recovery overload protection is applied when an overload is detected by the other arrangement.

The invention also provides a control IC (semiconductor device) having this functionality, and provides a switching power supply device that uses this control IC and has the peripheral circuits for implementing latch-off type overload protection and auto-recovery type overload protection.

SUMMARY OF THE INVENTION

To achieve this object a semiconductor device according to one aspect of the invention is used in a switching power supply device that has a transformer having a primary coil, a secondary coil, and an auxiliary coil, a switching device that switches to control a first DC voltage input to the primary coil, and an output voltage generating unit operable to generate a second DC voltage as an output voltage by rectifying and smoothing the AC voltage generated in the secondary coil as a result of the switching operation of the switching device. The semiconductor device has a first external connection pin which is disposed to a control circuit operable to control the switching operation of the switching device, and to which is input the rectified and smoothed voltage level of the AC voltage of the auxiliary coil proportional to the secondary coil; a first detector operable to detect an overload when an energy supplied to the output voltage generating unit is greater than or equal to a predetermined level; and a second detector operable to have a maximum value set for the energy supplied to the output voltage generating unit, and to detect an overload when the voltage of the first external connection pin is less than or equal to a predetermined level. The control circuit applies different overload protection when an overload is detected by the first and the second detector.

A switching power supply device operable to convert a DC input voltage to a DC output voltage according to another aspect of the invention has a switching arrangement operable to switch the DC input voltage; a transformer arrangement operable to produce an AC output voltage and an auxiliary AC voltage based on the switched DC input voltage; a DC output voltage generator operable to rectify the AC output voltage and to produce a DC output voltage; an auxiliary DC voltage generator operable to rectify the auxiliary AC voltage and to produce an auxiliary DC voltage substantially proportional to the DC output voltage; and a controller operable to control the switching operation of the switching arrangement. The controller includes an oscillation signal generator operable to generate an oscillation signal that repeatedly goes periodically to an operating state level and a non-operating state level based on the DC output voltage or auxiliary DC voltage, and to switch the switching arrangement based on the oscillation signal.

Another aspect of the invention is a semiconductor device that is used in a switching power supply device operable to convert a DC input voltage to a DC output voltage, the switching power supply device including a switching arrangement operable to switch the DC input voltage; a transformer arrangement operable to produce an AC output voltage and an auxiliary AC voltage based on the switched DC input voltage; a DC output voltage generator operable to rectify the AC output voltage and to produce a DC output voltage; an auxiliary DC voltage generator operable to rectify the auxiliary AC voltage and to produce an auxiliary DC voltage substantially proportional to the DC output voltage; and a controller operable to control the switching operation of the switching arrangement; and the controller is rendered as a semiconductor chip.

Another aspect of the invention is a control method for a switching power supply device operable to convert a DC input voltage to a DC output voltage, the control method having switching the DC input voltage; producing an AC output voltage and an auxiliary AC voltage based on the switched DC input voltage; rectifying the AC output voltage and producing a DC output voltage; rectifying the auxiliary AC voltage and producing an auxiliary DC voltage substantially proportional to the DC output voltage; and controlling the switching operation of the switching step. The step of controlling the switching operation includes a step of generating an oscillation signal that repeatedly goes periodically to an operating state level and a non-operating state level based on the DC output voltage or auxiliary DC voltage and controlling the switching operation based on the oscillation signal.

By using a single type of switching power supply device IC (semiconductor device), the invention enables selecting auto-recovery or latch-off type overload protection by slightly modifying peripheral circuits added to the semiconductor device. In addition, by adding a simple circuit to a separate part, the output power at which overload protection operates can be set by the peripheral circuits added to the semiconductor device instead of by the semiconductor device. The general utility of the semiconductor device (control IC) for the switching power supply device can thus be improved, and a semiconductor device that meets the needs of more power supply device designers can be provided.

Furthermore, selecting the overload protection arrangement is afforded by adding very few parts, and therefore results in a very slight cost increase.

Yet further, the ability to use a single semiconductor device for a wider range of applications eliminates the need to maintain a variety of semiconductor devices only to afford different types of overload protection, and semiconductor device development cost can be greatly reduced.

Yet further, by rendering a function causing the maximum current to drop when the CC pin voltage VCC goes below a predetermined level, the difference between the maximum output current enabling rated voltage control and the output current at which overload protection operates due to a drop in the smoothed voltage (auxiliary supply voltage VCC) of the auxiliary coil can be reduced. Cost can therefore be reduced because the current rating of the power supply components can be reduced.

Furthermore, because overload protection operates when current exceeding a predetermined level flows to the rated voltage DD pin, overload protection can be applied using the rise in the smoothed voltage of the auxiliary coil. As a result, the output power at which overload protection operates can be set by the potential difference detection circuit between the CC pin and DD pin. This enables setting the output power at which overload protection operates more easily than by the transformer design alone.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
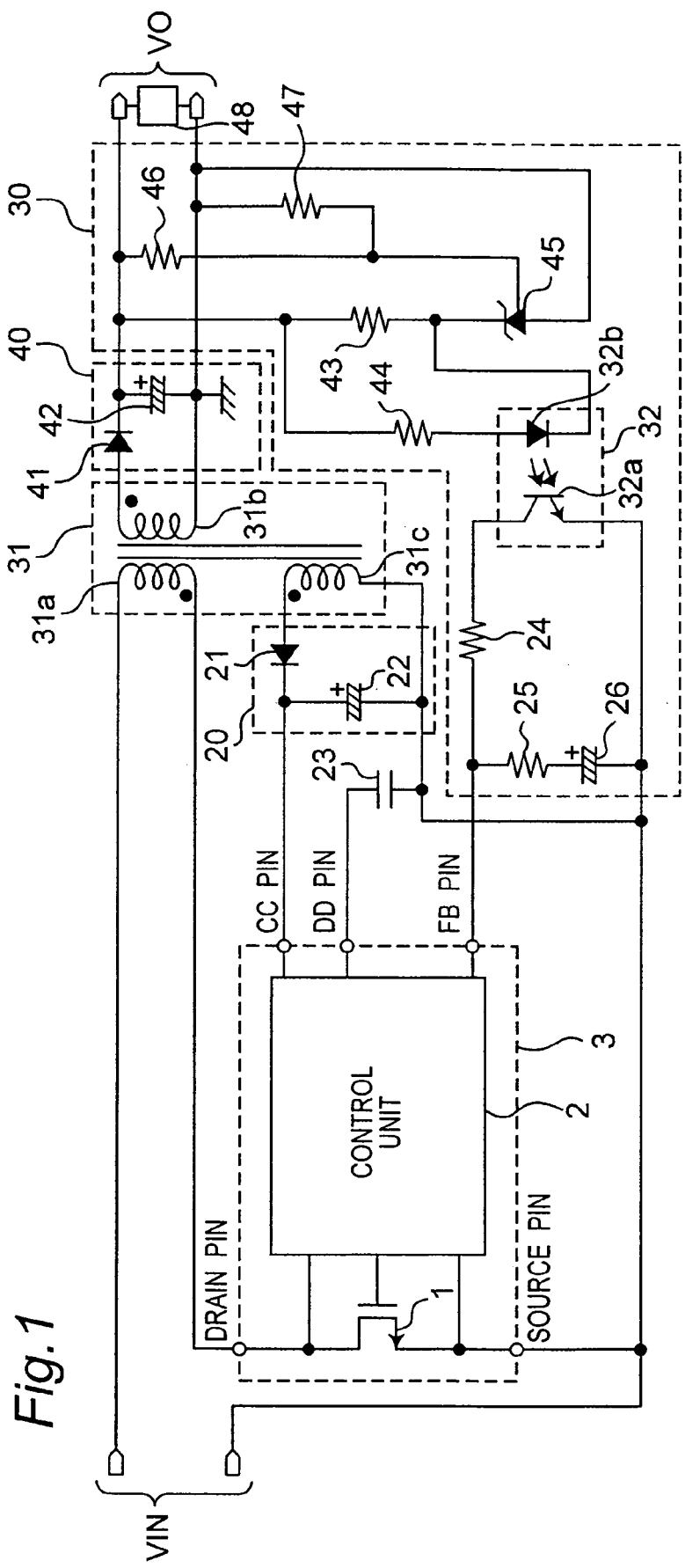
FIG. 1 is a block diagram showing the arrangement of a switching power supply device according to a first aspect of the invention.

Preferred embodiments of the present invention are described below with reference to the accompanying figures wherein parts that are effectively identical in arrangement, operation, and effect are identified by the same reference numerals. In addition, numeric values used in the following description of the invention are used by way of example to better describe the invention, and the invention is not limited to these values.

First Embodiment

Figure 2:
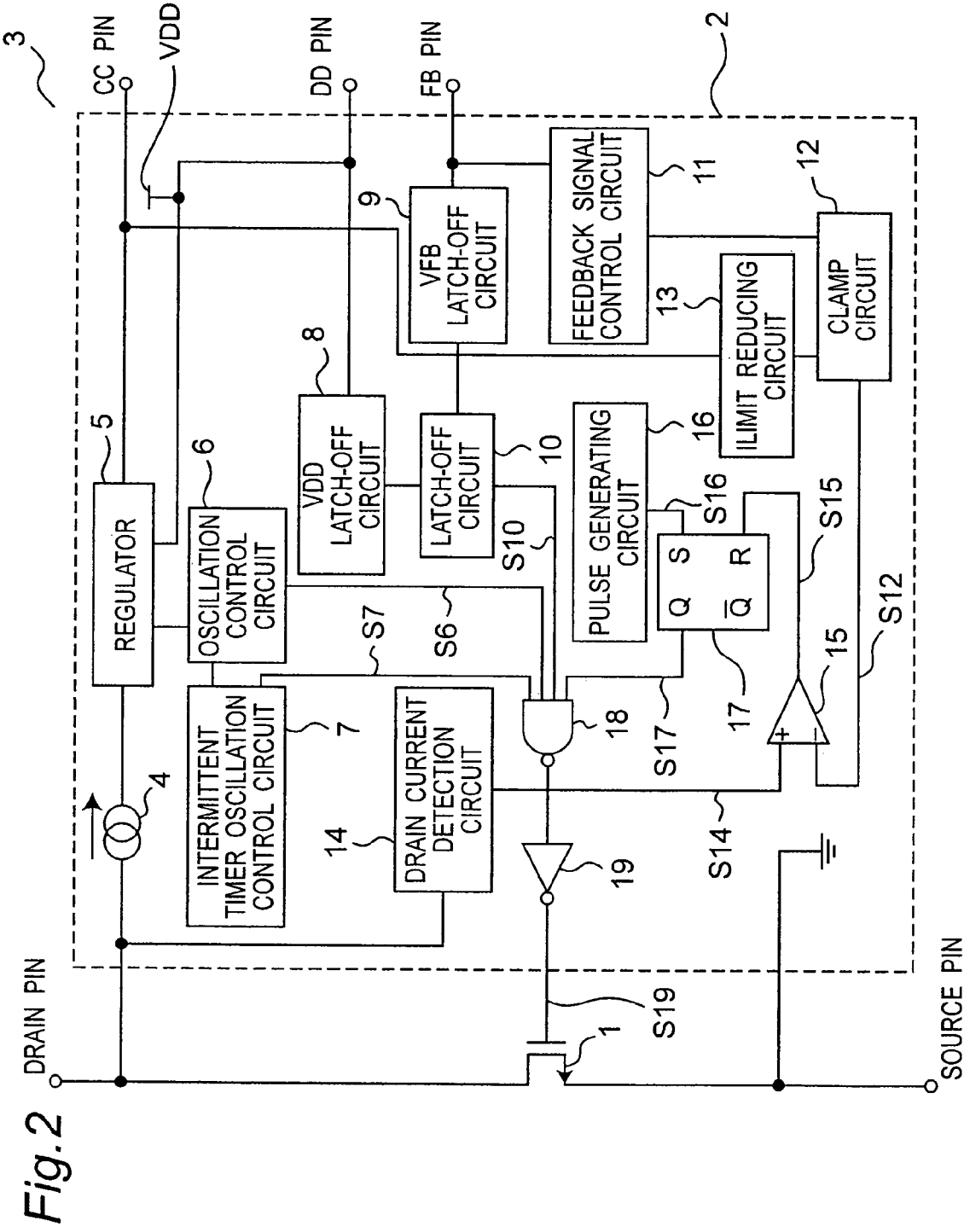
FIG. 2 is a block diagram showing the arrangement of a semiconductor device according to a first embodiment of the invention.

FIG. 1 is a block diagram showing the circuit arrangement of a semiconductor device that is a switching power supply control IC according to a first aspect of the invention and a switching power supply device that uses this semiconductor device. FIG. 2 is a block diagram showing the arrangement of a semiconductor device that is the switching power supply control IC according to this first embodiment of the invention.

The first embodiment of the invention is described next with reference to the figures.

As shown in FIG. 1 and FIG. 2, the semiconductor device 3 that is a switching power supply control IC according to the present invention includes a switching device 1 and a control unit 2 that control the operation of the switching device 1. The switching device 1 and control unit 2 can be packaged together on a single semiconductor chip, or they can be separately packaged on discrete semiconductor chips.

The semiconductor device 3 has five external input pins, an input pin (drain pin) for the switching device 1, an auxiliary power supply pin (CC pin) for inputting auxiliary supply voltage VCC, an internal power supply pin (DD pin) to which power supply voltage VDD for internal circuits is applied, a feedback pin (FB pin) where the feedback voltage VFD is applied, and two ground pins (source nodes) for the control unit 2 that are also the output nodes of the switching device 1. The auxiliary power supply voltage VCC is also called the auxiliary DC voltage, and the auxiliary power supply pin CC is also called the auxiliary DC voltage pin. The feedback pin is also called the feedback voltage pin.

The switching device 1 can be a MOS transistor, bipolar transistor, IGBT (insulated gate bipolar transistor), or other device. In this first embodiment of the invention the switching device 1 is an n-channel MOS transistor. The switching device 1 can also be rendered using two or more such transistors. Because the switching device 1 can be composed of a plurality of devices, the switching device 1 is also referred to as a switching unit.

The transformer 31 has a primary coil 31a, secondary coil 31b, and auxiliary coil 31c. The primary coil 31a and secondary coil 31b are opposite polarity, and the switching power supply device is feedback controlled. The transformer 31 converts an AC voltage and is generally referred to as a transformer unit.

The switching device 1 switches the DC input voltage VIN. The DC input voltage VIN selected by the switching device 1 is input to the primary coil 31a of the transformer 31, and the transformer 31 produces an AC output voltage at secondary coil 31b and an auxiliary AC voltage at auxiliary coil 31c.

An auxiliary power supply unit 20 including a diode 21 and a capacitor 22 is connected to the auxiliary coil 31c. The auxiliary coil 31c has the same polarity as the secondary coil 31b, and as a result of the switching operation of the switching device 1, the auxiliary power supply unit 20 rectifies and smoothes the AC voltage (auxiliary AC voltage) produced in the auxiliary coil 31c to produce an auxiliary supply voltage VCC (also referred to below as the CC pin voltage VCC) that is substantially proportional to the output voltage VO and is applied to the CC pin. The auxiliary power supply unit 20 is thus also referred to as an auxiliary DC voltage generating unit, and the auxiliary supply voltage VCC is also referred to as an auxiliary DC voltage.

Photocoupler 32 is a control signal relay circuit for passing a control signal from the secondary side to the primary side, and includes phototransistor 32a and photodiode 32b.

A resistance 24 and the phototransistor 32a of the photocoupler 32 are connected in series between the FB pin and source pin, and the semiconductor device 3 adjusts the output power supply and controls the output voltage VO to a specified level by changing the current flow to the phototransistor 32a, that is, the current flow from the FB pin. As current flow from the FB pin rises, the control unit 2 controls the switching device 1 so that the output power decreases and the output voltage VO does not rise excessively. If the current flow from the FB pin drops, the control unit 2 controls the switching device 1 so that the output power rises and the output voltage VO does not drop.

An output voltage generating unit 40 including a diode 41 and capacitor 42 is connected to the secondary coil 31b. The output voltage generating unit 40 thus rectifies and smoothes the AC voltage (secondary AC voltage) produced by the secondary coil 31b as a result of the switching operation of the switching device 1 to generate and applied output voltage VO (second DC voltage) to the load 48. The output voltage generating unit 40 is also called a DC output voltage generating unit, the secondary AC voltage is also called an AC output voltage, and the output voltage VO is also called a DC output voltage.

A shunt regulator 45 and resistances 46 and 47 detect the output voltage VO. The shunt regulator 45 changes the current flowing to the shunt regulator 45 according to the output voltage VO, and thus changes the current flow to the photodiode 32b of the photocoupler 32. Current flow to the shunt regulator 45 and current flow to the photodiode 32b rise as the output voltage VO rises, and decrease as the output voltage VO drops.

Referring to FIG. 2, the regulator 5 supplies current from the CC pin to the internal power supply pin DD and capacitor 23, and stabilizes the DD pin voltage VDD (internal power supply voltage VDD) representing the supply voltage for the internal circuits of the semiconductor device 3 at a predetermined level. If the CC pin voltage VCC (auxiliary supply voltage VCC) is less than the predetermined voltage, the regulator 5 functions to supply current from the drain pin to the CC pin.

More specifically, the regulator 5 also supplies current to the capacitor 22 of the auxiliary power supply unit 20 from the drain pin through the rated current source 4 and CC pin to boost the CC pin voltage VCC before the switching operation (referred to below as oscillation) of the switching device 1 starts. When the CC pin voltage VCC rises to the oscillation-enabling voltage VCCON, the regulator 5 changes the oscillation control signal S6 denoting output from the oscillation control circuit 6 to NAND 18 from a LOW level signal to a HIGH level signal, and thus starts the switching device 1 oscillating.

After the switching operation of the switching device 1 starts, current supply from the drain pin to the CC pin stops, and current flows from the auxiliary coil 31c through the auxiliary power supply unit 20 to the CC pin.

When the CC pin voltage VCC drops to the oscillation-disabling voltage VCCOFF, the oscillation control signal S6 goes from a HIGH level signal to a LOW level signal, thus stopping the switching device 1 from switching. The HIGH oscillation control signal level is also called the "oscillation level," and the LOW oscillation control signal is also called the "off level." The oscillation-disabling voltage VCCOFF and oscillation-enabling voltage VCCON are also called an "auxiliary voltage" because both are simply a specified level of the auxiliary DC voltage VCC.

When the CC pin voltage VCC rises to the oscillation-enabling voltage VCCON in the regulator 5 during startup, the oscillation control circuit 6 enables the switching device 1 to start oscillating by setting the signal level of the oscillation control signal S6 from a LOW level signal to a HIGH level signal. When the CC pin voltage VCC drops to the oscillation-disabling voltage VCCOFF while the switching device 1 is oscillating, the oscillation control circuit 6 switches the oscillation control signal S6 from a HIGH level signal to a LOW level signal, and thus stops the switching device 1 from oscillating.

Whether the switching device 1 actually oscillates (oscillating state) when the oscillation control signal S6 is HIGH depends on the logic level of signal input to the NAND 18 other than the oscillation control signal S6. When the oscillation control signal S6 is LOW, the switching device 1 unconditionally stops oscillating (goes off). The control unit 2 thus sets the switching device 1 to the oscillation-enabled state (on) when the oscillation control signal S6 is HIGH, and sets the switching device 1 to the oscillation-disabled state (off) when the oscillation control signal S6 is LOW. When the switching device 1 is in the oscillation-enabled state, the switching device 1 switches to the oscillating (on) or non-oscillating (off) state depending on the logic level of signal input to the NAND 18, and when the switching device 1 is in the oscillation-disabled state, the switching device 1 is off.

The intermittent timer oscillation control circuit 7 has a function for detecting the CC pin voltage VCC through the oscillation control circuit 6, and counting the number of times the CC pin voltage VCC drops to the oscillation-disabling voltage VCCOFF to a limit of four times. Once oscillation starts, the intermittent timer oscillation control circuit 7 sets the oscillation control signal S7 denoting output to the NAND 18 to a HIGH level signal and sets the switching device 1 to the oscillation-enabled state until the CC pin voltage VCC drops to oscillation-disabling voltage VCCOFF. After the CC pin voltage VCC drops to oscillation-disabling voltage VCCOFF, the oscillation control signal S7 goes to a LOW level signal and the switching device 1 is set to an oscillation-disabled state if the CC pin voltage VCC has dropped to the oscillation-disabling voltage VCCOFF 1 to 3 times. If the CC pin voltage VCC has dropped to the oscillation-disabling voltage VCCOFF 0 or 4 times, the oscillation control signal S7 goes to a HIGH level signal and the switching device 1 is set to the oscillation-enabled state. While the switching device 1 is oscillating, the number of times the CC pin voltage VCC dropped to oscillation-disabling voltage VCCOFF is reset to 0.

When the CC pin voltage VCC goes to the oscillation-disabling voltage VCCOFF, the intermittent timer oscillation control circuit 7 sets the oscillation control signal S7 LOW for a predetermined time and thus sets the switching device 1 to the oscillation-disabled state. When CC pin voltage VCC then rises to oscillation-enabling voltage VCCON, the oscillation control circuit 6 sets the oscillation control signal S6 HIGH and the switching device 1 resumes oscillation.

When current exceeding a specified level flows to the DD pin, the VDD latch-off circuit 8 outputs a stop signal to the latch-off circuit 10. When the FB pin voltage VFB rises to a predetermined voltage VFBOL, the VFB latch-off circuit 9 outputs a stop signal to the latch-off circuit 10. The VDD latch-off circuit 8 and latch-off circuit 10 together are simply called an off circuit. The VFB latch-off circuit 9 and latch-off circuit 10 together are also simply called an off circuit. The voltage VFBOL is also called the feedback voltage level.

During normal operation the latch-off circuit 10 sets the oscillation control signal S10 representing output to the NAND 18 to a HIGH level signal to set the oscillation-enabled state. However, if a stop signal is input from the VDD latch-off circuit 8 or VFB latch-off circuit 9, the oscillation control signal S10 goes LOW and the switching device 1 remains set to the oscillation-disabled state. The switching device 1 therefore stops and latches off. This latch off state is not cleared until the CC pin voltage VCC drops, current supply to the DD pin stops, and the DD pin voltage drops to or below a predetermined level. More specifically, the switching device 1 does not resume the oscillation-enabled state until the DC input voltage VIN drops and the drain pin voltage drops.

The regulator 5, oscillation control circuit 6, intermittent timer oscillation control circuit 7, VDD latch-off circuit 8, VFB latch-off circuit 9, and latch-off circuit 10 render an oscillation control signal generating unit. The oscillation control signal generating unit generates an oscillation control signal based on the auxiliary DC voltage VCC, and sets the oscillation control signal to the off state level when the auxiliary DC voltage VCC drops to the oscillation-disabling voltage VCCOFF or below to stop the switching operation of the switching device 1. When the FB pin voltage VFB rises to or above feedback voltage VFBOL, the VFB latch-off circuit 9 and latch-off circuit 10 set the oscillation control signal S10 to the off level. When the oscillation control signal S10 is set to the off level, the oscillation control signal generating unit holds the stop state level even if the FB pin voltage VFB goes below the feedback voltage VFBOL.

The feedback signal control circuit 11 outputs to the clamp circuit 12 a voltage signal that decreases when the current outflow through the FB pin rises and increases when said current outflow drops. This feedback signal control circuit 11 also has a function for outputting a specific current when external current is not needed, that is, even when the phototransistor 32a shown in FIG. 1 does not pass current. The current flowing out from the FB pin is also called the feedback current.

The clamp circuit 12 limits the peak of the voltage signal output from the feedback signal control circuit 11 to clamping voltage VCL or less, and outputs a target signal S12 representing this limited signal to comparator 15. As a result, the target signal S12 is less than or equal to clamping voltage VCL. If the voltage signal output from the feedback signal control circuit 11 is less than the clamping voltage VCL, the voltage signal is used as the target signal S12 without change. The clamping voltage VCL of the clamp circuit 12 limits the drain current ID flowing to the switching device 1. The clamp circuit 12 protects against overcurrent flow to the switching device 1, and is therefore also called an overcurrent protection circuit.

The ILIMIT reducing circuit 13 detects CC pin voltage VCC, decreases the clamping voltage VCL of the clamp circuit 12 as the CC pin voltage VCC goes below oscillation-enabling voltage VCCON and approaches oscillation-disabling voltage VCCOFF, and thus lowers the maximum current ILIMIT.

The feedback signal control circuit 11, clamp circuit 12, and ILIMIT reducing circuit 13 together render a target signal generating unit.

The drain current detection circuit 14 detects drain current ID, and outputs a drain current signal S14 denoting a voltage proportional to the drain current ID to the comparator 15. When the drain current signal S14 is greater than or equal to target signal S12, the comparator 15 outputs comparison result signal S15 denoting a high level to the reset terminal of the RS flip-flop circuit 17.

The pulse generating circuit 16 outputs a pulse voltage signal with a specific frequency (below referred to as CLOCK signal S16) to the set pin of the RS flip-flop circuit 17. The comparison result signal S15 is input to the reset pin and the CLOCK signal S16 is input to the set pin of the RS flip-flop circuit 17. The RS flip-flop circuit 17 outputs a HIGH oscillation signal S17 to the NAND 18 at each period of the CLOCK signal S16 from when the CLOCK signal S16 rises until the comparison result signal S15 goes HIGH. When the oscillation signal S17 is HIGH is referred to as the operating state level; when the oscillation signal S17 is LOW is referred as the non-operating state level.

The NAND 18 and 19 generate drive signal S19 based on oscillation control signals S6, S7, S10, and oscillation signal S17. When all of the oscillation control signals are HIGH (oscillation-enabled state), the drive signal S19 turns the switching device 1 on to oscillate at each period of the CLOCK signal S16. More specifically, the oscillation control signal generating unit outputs oscillation control signals S6, S7 and S10 at the oscillation state level at which the oscillation signal S17 is output or the stop state level that stops oscillation signal S17 output, and sets the oscillation control signals S6, S7 and S10 to the stop state level to stop the switching operation of the switching device 1 when the auxiliary DC voltage VCC goes to oscillation-disabling voltage VCCOFF or below.

The pulse generating circuit 16, RS flip-flop circuit 17, NAND 18, and 19 render a drive signal generating unit. The target signal generating unit, drain current detection circuit 14, comparator 15, pulse generating circuit 16, and RS flip-flop circuit 17 render an oscillation signal generating unit. The oscillation signal generating unit generates an oscillation signal S17 that periodically switches between the operating state level and non-operating state level based on the DC output voltage VO, and causes the switching device 1 to switch based on the oscillation signal S17.

These arrangements enable current through the FB pin to control the drain current ID peak ("IDP" below), that is, current mode pulse width modulation (PWM) control. While the drain current ID changes in each period of the CLOCK signal S16, the maximum drain current ID is drain current peak IDP. More specifically, because target signal S12 drops as current flow through the FB pin rises, the oscillation signal S17 is produced so that the drain current peak IDP drops. Conversely, because target signal S12 rises when current flow through the FB pin decreases, oscillation signal S17 is generated so that the drain current peak IDP rises. The clamp circuit 12 functions to set the maximum current ILIMIT level of the drain current peak IDP.

The drain current detection circuit 14 detects the drain current signal S14 representing the drain current ID peak, and is therefore also called a peak signal detection circuit.

The maximum current ILIMIT denotes the upper limit of the target signal S12, and is therefore also called the upper target limit ILIMIT. The oscillation signal generating unit thus includes the drain current detection circuit 14 for detecting the drain current signal S14 denoting the peak switching current flowing to the switching device 1, and a target signal generating unit for generating the target signal S12 representing the target level of the drain current signal S14 based on the DC output voltage VO, and generates the oscillation signal S17 based on the drain current signal S14 and target signal S12. The target signal generating unit sets the upper target limit ILIMIT based on the auxiliary DC voltage VCC, and limits the target signal S12 to upper target limit ILIMIT or less.

The switching power supply device shown in FIG. 1 is an example of a circuit arrangement that uses the semiconductor device 3 shown in FIG. 2 to provide overload protection by detecting an overload and latching off when the drain current peak IDP of the drain current ID passing through the switching device 1 reaches a predetermined level.

The shunt regulator 45 detects slight variations in the output voltage VO, and the switching power supply device controls the output voltage VO to substantially maintain a predetermined level even when the output power varies by changing the drain current peak IDP of the drain current ID from the switching device 1 when the current to the photodiode 32b and phototransistor 32a and the current from the FB pin vary.

More specifically, if the load decreases and the output voltage VO increases during normal load conditions, current flow to the 32ba and phototransistor 32a and current outflow from the FB pin increase, the target signal S12 decreases, and the oscillation signal S17 is generated so that the drain current peak IDP decreases. Conversely, if the load increases and the output voltage VO decreases, current flow to the 32ba and phototransistor 32a and current outflow from the FB pin decrease, the target signal S12 increases, and the oscillation signal S17 is generated so that the drain current peak IDP rises. Variation in the drain current peak IDP therefore works to cancel variation in the output voltage VO, and the output voltage VO is therefore stabilized irrespective of the load during normal load conditions.

Output power increases as the load continues to increase, and the drain current peak IDP rises. When the drain current peak IDP reaches the maximum current ILIMIT, the control unit 2 and switching device 1 cannot further increase the output power even if the load increases further. The output voltage VO therefore drops, and current stops flowing to the photodiode 32b and phototransistor 32a of the photocoupler 32.

Because current flows through the FB pin even when the phototransistor 32a does not pass current, current from the FB pin charges the capacitor 26. As a result, the FB pin voltage VFB rises, eventually rises to feedback voltage VFBOL, and the switching operation of the switching device 1 latches off. In other words, during an overload state when the load is greater than when the drain current peak IDP is at a predetermined level and the output power is at a predetermined level, the FB pin voltage VFB rises and latches off. During normal load conditions, sufficient current flows to the phototransistor 32a without the output voltage VO dropping, and the FB pin voltage VFB is less than or equal to feedback voltage VFBOL.

A timer latch that causes a latch off only when an overload state continues for a predetermined time can also be achieved by increasing the capacity of the capacitor 26 for current from the FB pin a certain amount. The feedback unit 30 including the shunt regulator 45 and photocoupler 32 is also sensitive to change in the output voltage VO, and the phototransistor 32a stops passing current when the drain current peak IDP reaches the maximum current ILIMIT and the output voltage VO drops only slightly. Overload protection thus operates as a result of the drain current peak IDP reaching the maximum current ILIMIT.

The feedback unit 30 includes the resistances 46 and 47, shunt regulator 45, resistances 43 and 44, photocoupler 32, resistances resistance 24 and 25, and capacitor 26. The feedback unit 30 and feedback signal control circuit 11 together render a feedback signal generating unit. The feedback signal generating unit generates a FB pin voltage VFB that rises as the DC output voltage VO drops.

First Variation of the First Embodiment

This first variation of the first embodiment is described below primarily with reference to the differences to the first embodiment. Other aspects of the arrangement, operation, and effect of this first variation are identical to the first embodiment, and further description thereof is omitted.

Figure 3:
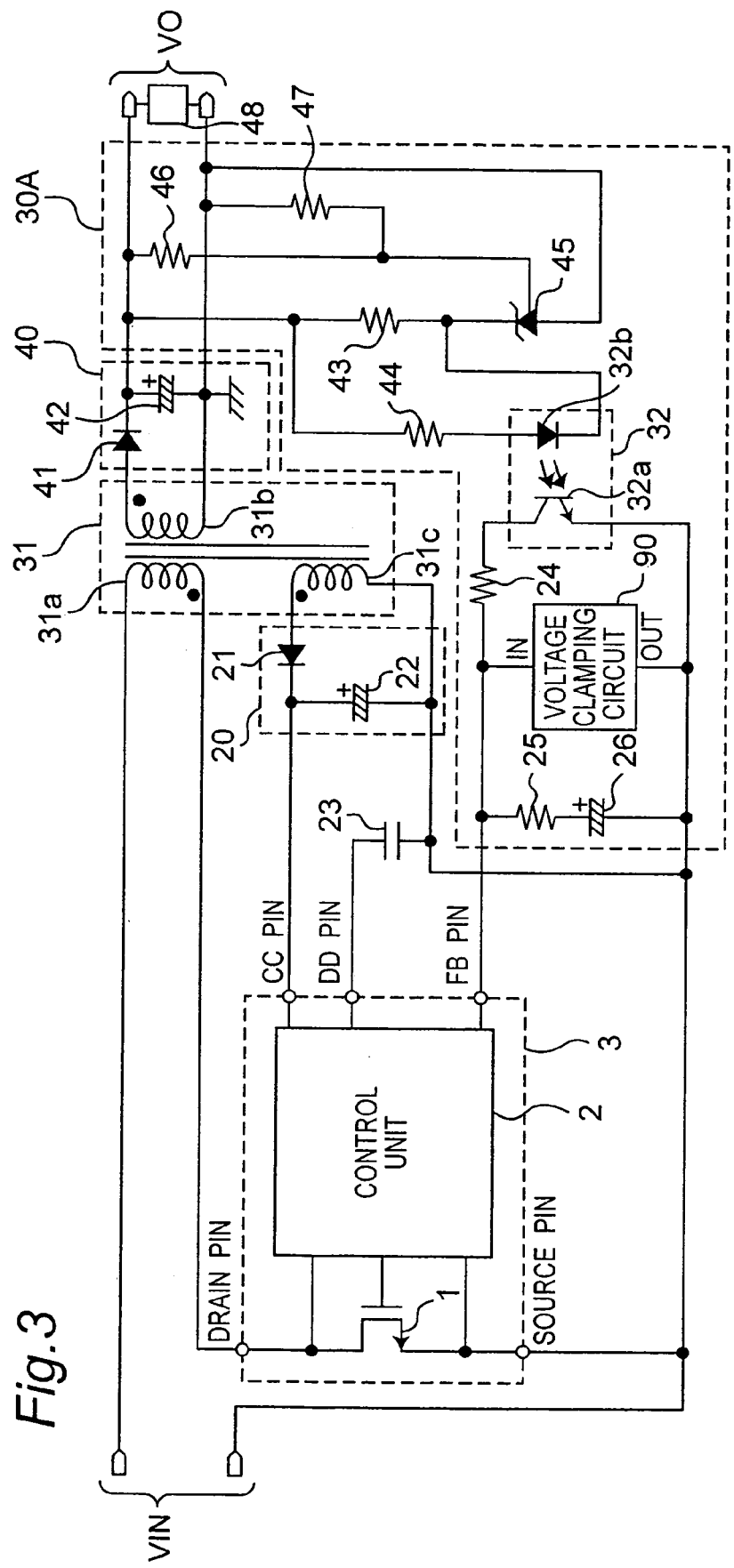
FIG. 3 is a block diagram showing the arrangement of a switching power supply device according to a first variation of the first embodiment.

The first variation of a switching power supply device according to the first embodiment of the invention shown in FIG. 3 is an example of a circuit arrangement that uses the semiconductor device 3 shown in FIG. 2 to provide auto-recovery overload protection when the smoothed voltage of the auxiliary coil 31c, that is, the CC pin voltage VCC, drops to or below a predetermined level and an overload is detected.

Figure 4:
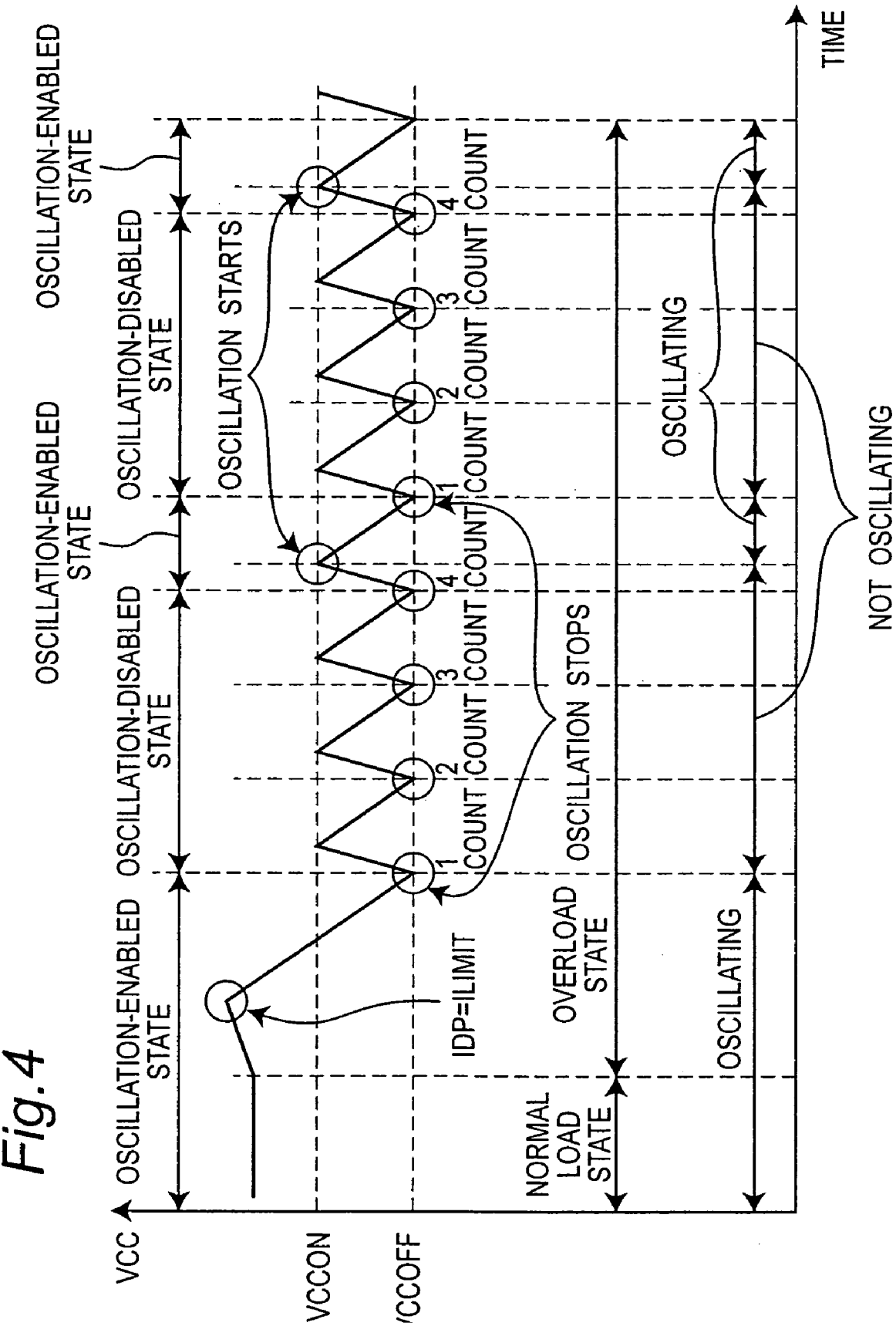
FIG. 4 is a timing chart describing the intermittent timer oscillation operation of auto-recovery overload protection.

The circuit shown in FIG. 3 differs from the first embodiment in the addition of a voltage clamping circuit 90 between the FB pin and source pin in the circuit shown in FIG. 1. The feedback unit 30 shown in FIG. 1 thus becomes feedback unit 30A as a result of adding voltage clamping circuit 90. FIG. 4 is a timing chart describing the operation of auto-recovery overload protection, and shows the change in the CC pin voltage VCC over time.

The voltage clamping circuit 90 has two nodes, IN and OUT, and functions to hold the potential difference between the nodes to less than a predetermined level. More specifically, the voltage clamping circuit 90 functions to hold the FB pin voltage VFB to less than feedback voltage VFBOL. As described above, when the load increases and the drain current peak IDP rises to maximum current ILIMIT, FB pin voltage VFB rises. With the arrangement shown in FIG. 3, however, the voltage clamping circuit 90 holds the FB pin voltage VFB to a voltage less than feedback voltage VFBOL, and the latch-off overload protection of the semiconductor device 3, which is a switching power supply control IC, does not operate. The oscillation control signal generating unit therefore does not set the oscillation control signal S10 to the stop state level.

As shown in FIG. 4, the switching device 1 oscillates when in the oscillation-enabled state, and the drain current peak IDP rises to the maximum current ILIMIT when the normal load state changes to an overload state. The CC pin voltage VCC drops together with the output voltage VO. When CC pin voltage VCC drops to the oscillation-disabling voltage VCCOFF (at which oscillation stops), the switching device 1 is set to the oscillation-disabled state and stops switching. The CC pin voltage VCC also rises to oscillation-enabling voltage VCCON because the regulator 5 starts supplying current from the drain pin to the CC pin.

As described above, the semiconductor device 3 has an intermittent timer oscillation control circuit 7 that can count the number of times the CC pin voltage VCC drops to oscillation-disabling voltage VCCOFF up to four times. If the count is 0 or 4, the switching device 1 is set to the oscillation-enabled state enabling oscillation, and if the count is from 1 to 3, inclusive, the switching device 1 is set to the oscillation-disabled state preventing the switching device 1 from oscillating. When the switching device 1 is oscillating, the count is set to 0. As a result, even if the CC pin voltage VCC drops to oscillation-disabling voltage VCCOFF while the switching device 1 is oscillating so that the switching device 1 stops oscillating, and CC pin voltage VCC then again rises to oscillation-enabling voltage VCCON, the count is set to 1 and the switching device 1 does not start oscillating.

When CC pin voltage VCC rises to oscillation-enabling voltage VCCON, the regulator 5 stops current supply from the drain pin to the CC pin, and current is supplied from the auxiliary coil 31c to the CC pin. Oscillation remains stopped, however, and CC pin voltage VCC therefore drops to oscillation-disabling voltage VCCOFF. As shown in FIG. 4, CC pin voltage VCC thereafter continues to rise and fall, but the switching device 1 does not oscillate until the CC pin voltage VCC drops to oscillation-disabling voltage VCCOFF four times. When this count reaches 4, the oscillation-enabled state is activated and oscillation resumes when CC pin voltage VCC rises to oscillation-enabling voltage VCCON (the start switching level). However, because of the overload state, CC pin voltage VCC drops to oscillation-disabling voltage VCCOFF (the stop switching level), and the switching device 1 is reset to the oscillation-disabled state and stops switching.

More specifically, a drop in the smoothed voltage of the auxiliary coil 31c during an overload causes the CC pin voltage VCC to rise and fall repeatedly as shown in FIG. 4, and the time that the switching device 1 is oscillating can be reduced to a desired ratio. The energy supplied to the secondary side of the transformer 31 can thus be reduced, and intermittent overload protection can be achieved.

If the overload condition is resolved while overload protection is working and the output voltage VO rises again, the smoothed voltage of the auxiliary coil 31c also rises, the CC pin voltage VCC stops dropping, and the normal power supply operation can resume. This type of overload protection is known as auto-recovery overload protection.

The CC pin voltage VCC when the power supply is operating normally must be higher than oscillation-disabling voltage VCCOFF. In other words, overload protection does not work if the CC pin voltage VCC does not drop to oscillation-disabling voltage VCCOFF. As a result, output voltage VO drops after the drain current peak IDP rises to maximum current ILIMIT when the load increases, and the output current IO tends to rise until the CC pin voltage VCC drops to oscillation-disabling voltage VCCOFF. That is, the difference between the maximum output current IOMAX at which rated voltage control is possible and the output current IOPRT at which overload protection works is large, and the semiconductor device 3 has the following function to solve this problem.

Figure 5:
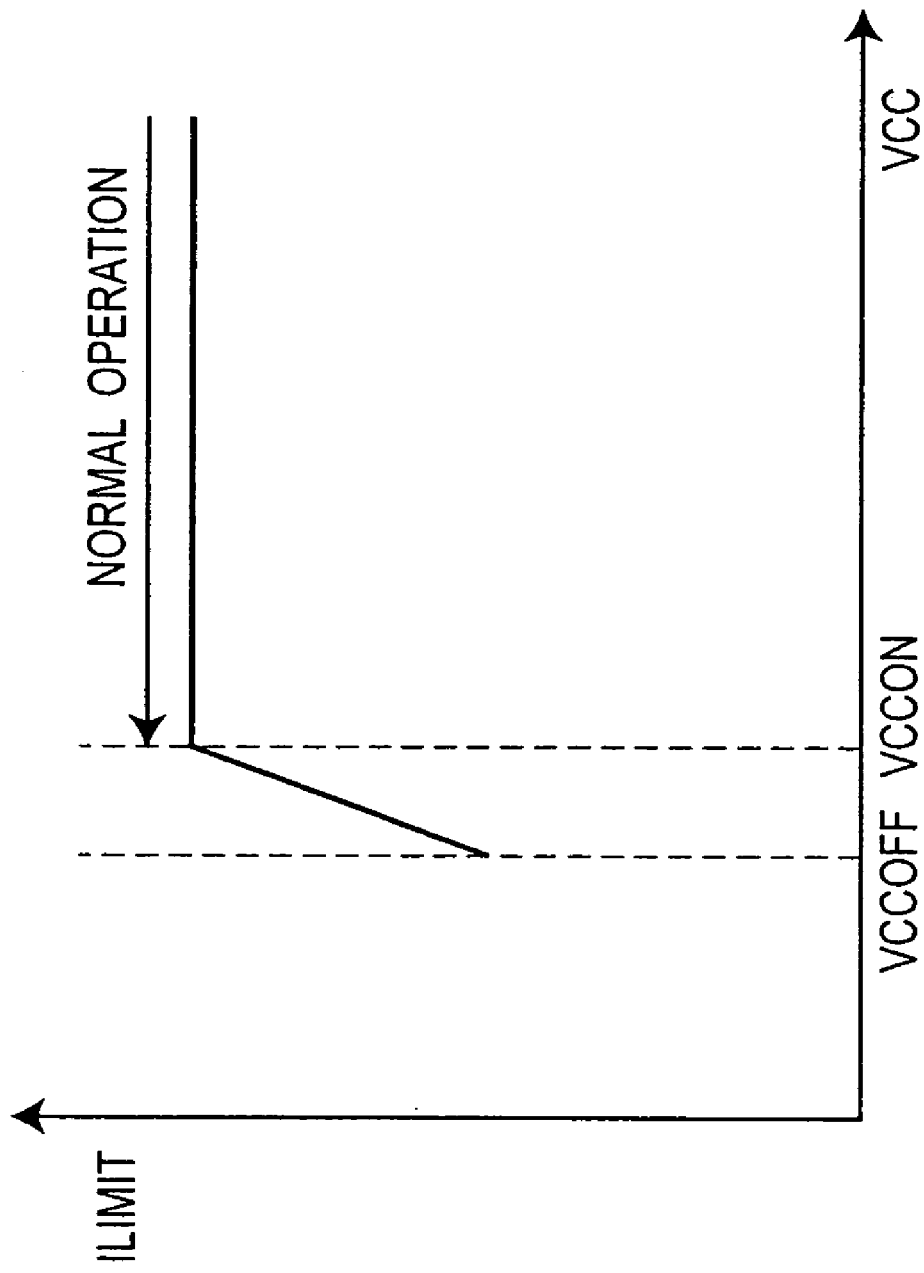
FIG. 5 shows the relationship between the CC pin voltage and the maximum current ILIMIT level of the drain current peak.

The ILIMIT reducing circuit 13 has a function for linearly lowering the maximum current ILIMIT as CC pin voltage VCC approaches oscillation-disabling voltage VCCOFF as shown in FIG. 5 when CC pin voltage VCC is lower than oscillation-enabling voltage VCCON. This function simplifies lowering the CC pin voltage VCC to oscillation-disabling voltage VCCOFF because the output power decreases as a result of the drain current peak IDP flowing through the switching device 1 decreasing when the CC pin voltage VCC is below oscillation-enabling voltage VCCON in the overload state. The difference between the maximum output current IOMAX enabling rated voltage control and the output current IOPRT at which overload protection operates can therefore be reduced. For this function to work, the CC pin voltage VCC must be higher than oscillation-enabling voltage VCCON when the power supply is operating normally.

This variation of the first embodiment thus enables converting a latch-off overload protection power supply to an auto-recovery type power supply with intermittent overload protection. The voltage clamping circuit 90 can also be achieved using a zener diode having a zener voltage less than or equal to the feedback voltage VFBOL.

Second Variation of the First Embodiment

This second variation of the first embodiment is described below primarily with reference to the differences to the first embodiment and first variation of the first embodiment. Other aspects of the arrangement, operation, and effect of this first variation are identical to the first embodiment, and further description thereof is omitted.

Figure 6:
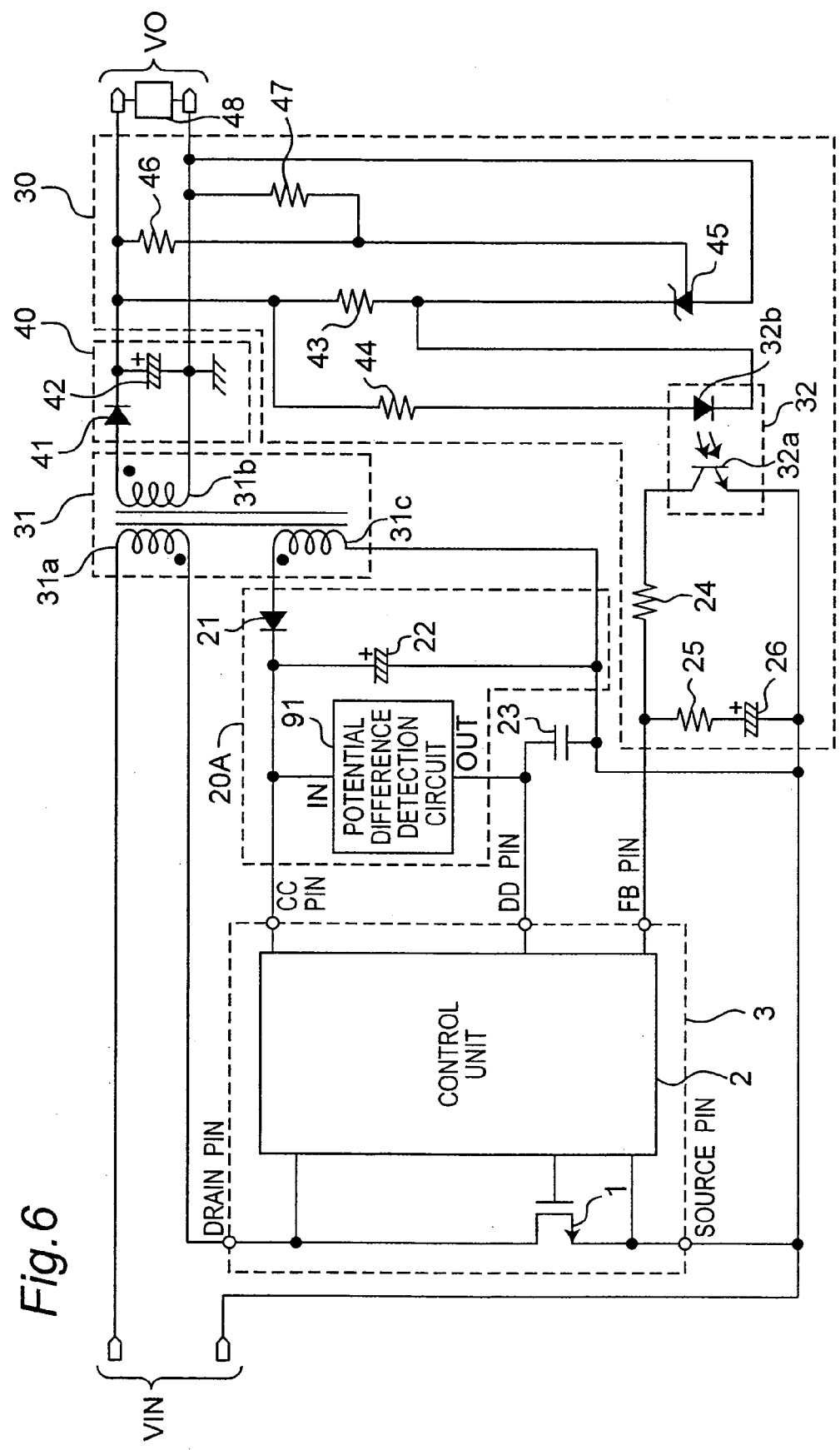
FIG. 6 is a block diagram showing the arrangement of a switching power supply device according to a second variation of the first embodiment.

This second variation of a switching power supply device according to the first embodiment of the invention shown in FIG. 6 is an example of a circuit arrangement that uses the semiconductor device 3 shown in FIG. 2 and adds a potential difference detection circuit 91 between the CC pin and DD pin to provide overload protection using the rise in the smoothed voltage of the auxiliary coil 31c when an overload occurs. The auxiliary power supply unit 20 shown in FIG. 1 becomes auxiliary power supply unit 20A as a result of adding the potential difference detection circuit 91.

The potential difference detection circuit 91 has two pins, IN and OUT, and passes current from the IN pin to the OUT pin when the potential difference between the pins is greater than or equal to a predetermined level. Because the DD pin is held to a predetermined voltage by the regulator 5 during the switching operation, current flows to the DD pin if the CC pin voltage VCC rises and the potential difference between the CC pin and DD pin exceeds a predetermined level. When current exceeding a predetermined level flows to the DD pin, the VDD latch-off circuit 8 of the semiconductor device 3 operates and the switching operation of the switching device 1 latches off. The signals representing the potential difference between the pins are also called a potential difference signal, and the potential difference detection circuit 91 that detects the potential difference signal is also called a potential difference detection circuit. The above-noted predetermined level is also called the rated voltage VPD.

Because the CC pin voltage VCC, which is the smoothed voltage of the auxiliary coil 31c, tends to rise as the output power rises, the switching power supply device shown FIG. 6 affords overload protection using the potential difference detection circuit 91 and the ability to latch off when current flows to the DD pin. In other words, overload protection operates and the power supply latches off when the CC pin voltage VCC rises to the voltage of the output power level that triggers overload protection. Latch-off type overload protection can thus be achieved. More specifically, the potential difference detection circuit 91 detects the potential difference signal when the CC pin voltage VCC rises to or above a predetermined auxiliary voltage VCCPD that is higher than oscillation-disabling voltage VCCOFF. The VDD latch-off circuit 8 sets the oscillation control signal to the stop state level based on the potential difference signal and maintains the oscillation control signal at the stop state level even when CC pin voltage VCC goes below auxiliary voltage VCCPD. The potential difference detection circuit 91 detects the potential difference signal when the potential difference between the CC pin and DD pin exceeds rated voltage VPD.

An arrangement in which the latch-off CC pin voltage VCCOVP is internally set by the control IC (semiconductor device 3 in this embodiment of the invention), and overload protection is forced to latch off when the CC pin voltage VCC goes to the latch-off CC pin voltage VCCOVP, is also possible. In this case the latch-off CC pin voltage VCCOVP must be adjusted by the transformer 31 setting alone so that the CC pin voltage VCC at the output power level causing overload protection to operate goes to the latch-off CC pin voltage VCCOVP. However, when potential difference detection circuit 91 is inserted between the DD pin and CC pin and the switching device 1 latches off when current flows to the DD pin, this can be accomplished by adjusting the potential difference between the two pins (IN, OUT) of the potential difference detection circuit 91 to the CC pin voltage VCC at the output power level causing overload protection to operate. This arrangement affords greater freedom of design than an arrangement in which the latch-off CC pin voltage VCCOVP is set in the semiconductor device 3 to achieve overload protection.

With the arrangement of the first embodiment shown in FIG. 1, FIG. 2, and FIG. 3, the maximum current ILIMIT set by internal circuits of the semiconductor device 3 determines the output power at which overload protection operates. In the second variation of the first embodiment, however, the design of the transformer 31 and the setting of the potential difference detection circuit 91 enable setting the output power at which overload protection operates as desired in the output power range where the drain current peak IDP is less than maximum current ILIMIT. Note that the potential difference detection circuit 91 can also be rendered using a zener diode. In this case a zener diode with a zener voltage that is the same as the potential difference between the CC pin and DD pin at which overload protection operates must be used.

As described above, the switching power supply device shown in FIG. 1 affording latch off overload protection can be rendered using a semiconductor device 3. In addition, the power supply device shown in FIG. 3 affording auto-recovery overload protection can also be rendered by simply adding a voltage clamping circuit 90 to the switching power supply device shown in FIG. 1. Yet further, a power supply in which the output power at which overload protection operates can be set by the transformer 31 design and the content of the potential difference detection circuit 91 can be rendered by adding a potential difference detection circuit 91 to the switching power supply device shown in FIG. 1.

By using a single type of switching power supply device IC (semiconductor device 3), the first embodiment of the invention and variations thereof thus enable selecting auto-recovery or latch-off type overload protection by slightly modifying peripheral circuits added to the semiconductor device 3. In addition, by adding a simple circuit to a separate part, the output power at which overload protection operates can be set by the peripheral circuits added to the semiconductor device 3 instead of by the semiconductor device 3. The general utility of the semiconductor device 3 (control IC) for the switching power supply device can thus be improved, and a semiconductor device 3 that meets the needs of more power supply device designers can be provided.

Furthermore, selecting the overload protection arrangement is afforded by adding very few parts, and therefore results in a very slight cost increase.

Yet further, the ability to use a single semiconductor device 3 for a wider range of applications eliminates the need to maintain a variety of semiconductor devices 3 only to afford different types of overload protection, and the semiconductor device 3 development cost can be greatly reduced.

Yet further, by rendering a function causing the maximum current ILIMIT to drop when the CC pin voltage VCC goes below a predetermined level, the difference between the maximum output current IOMAX enabling rated voltage control and the output current IOPRT at which overload protection operates due to a drop in the smoothed voltage (auxiliary supply voltage VCC) of the auxiliary coil 31c can be reduced. Cost can therefore be reduced because the current rating of the power supply components can be reduced.

Furthermore, in an arrangement in which overload protection operates when current exceeding a predetermined level flows to the DD pin (rated voltage pin), the potential difference detection circuit 91 between the CC pin and DD pin can set the output power at which overload protection operates using the rise in the smoothed voltage of the auxiliary coil 31c. This arrangement enables setting the output power at which overload protection operates more easily than by the transformer 31 design alone.

Figure 7:
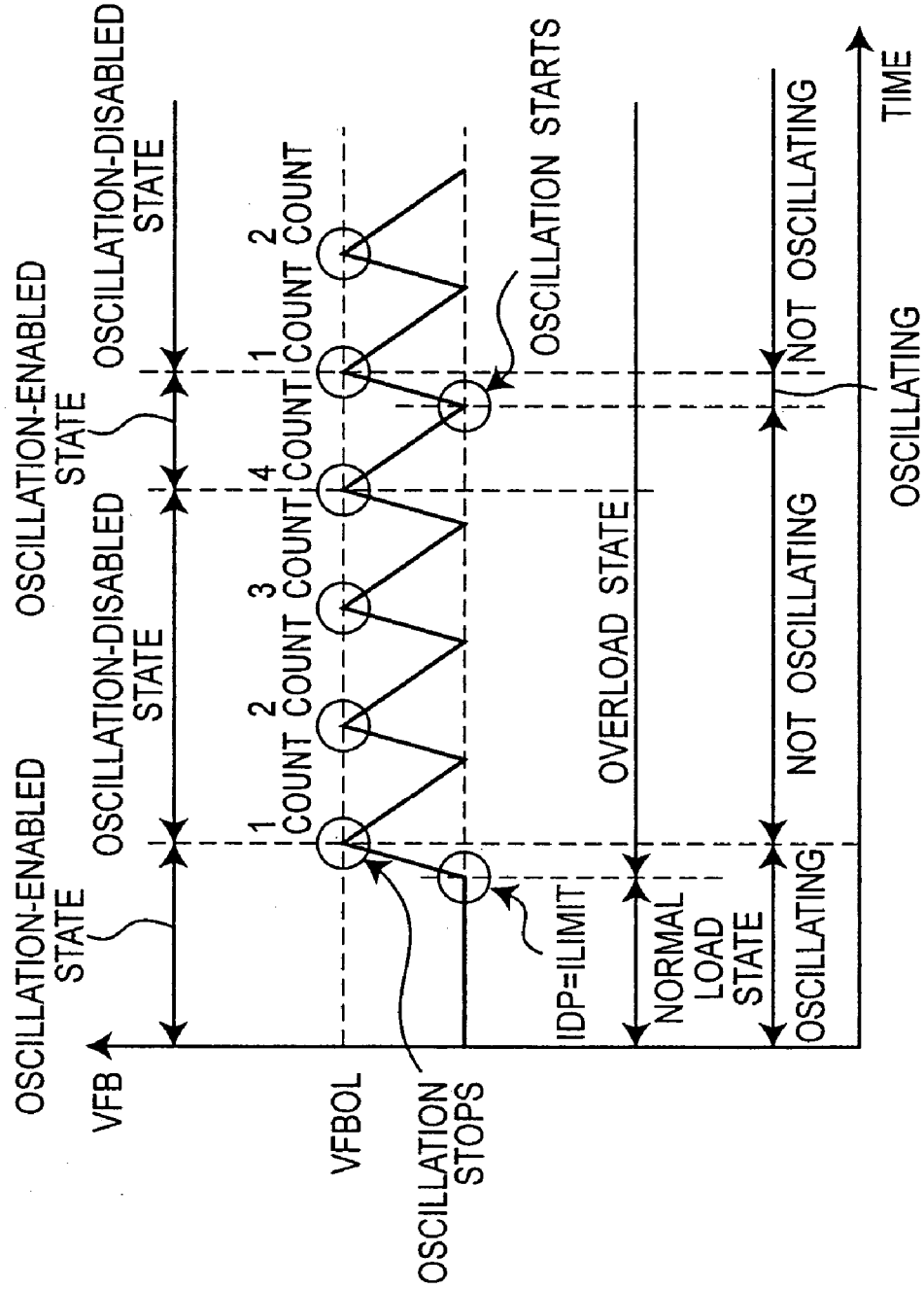
FIG. 7 is a timing chart showing the intermittent oscillation operation afforded by the FB pin.

The semiconductor device 3 in this first embodiment of the invention affords overload protection causing the FB pin voltage VFB to rise and latch off when the drain current peak IDP rises to the maximum current ILIMIT, and auto-recovery overload protection enabling intermittent switching when the smoothed voltage (auxiliary supply voltage VCC) of the auxiliary coil 31c drops to the oscillation-disabling voltage VCCOFF. If the semiconductor device 3 enables auto-recovery and latch off overload protection using two different arrangements for detecting an overload, other configurations are also possible. As shown in FIG. 7, for example, drain current peak IDP rising to maximum current ILIMIT could cause the FB pin voltage VFB to rise to feedback voltage VFBOL and stop oscillation. Thereafter, intermittently operating overload protection that starts oscillation once every four times the FB pin voltage VFB drops can be implemented as the FB pin voltage VFB continues to rise and fall. This affords an alternative arrangement relating to the overload protection of a semiconductor device 3 that detects a drop in the CC pin voltage VCC and latches off.

The first embodiment of the invention affords intermittent operation enabling oscillation to start once in four counts, but intermittent operation once every N times (where N is an integer of 2 or more) is also possible insofar as the oscillation period is limited and output power can be suppressed.

In this first embodiment of the invention the drain current peak IDP rising to the maximum current ILIMIT causes the FB pin voltage VFB to rise and overload protection to operate. Alternatively, an overload protection pin can be added to the semiconductor device 3 to afford an arrangement in which the voltage of this overload protection pin rises when peak current flow to the switching device 1 exceeds a predetermined level, and overload protection operates when this overload protection pin voltage reaches a predetermined level.

Figure 8B:
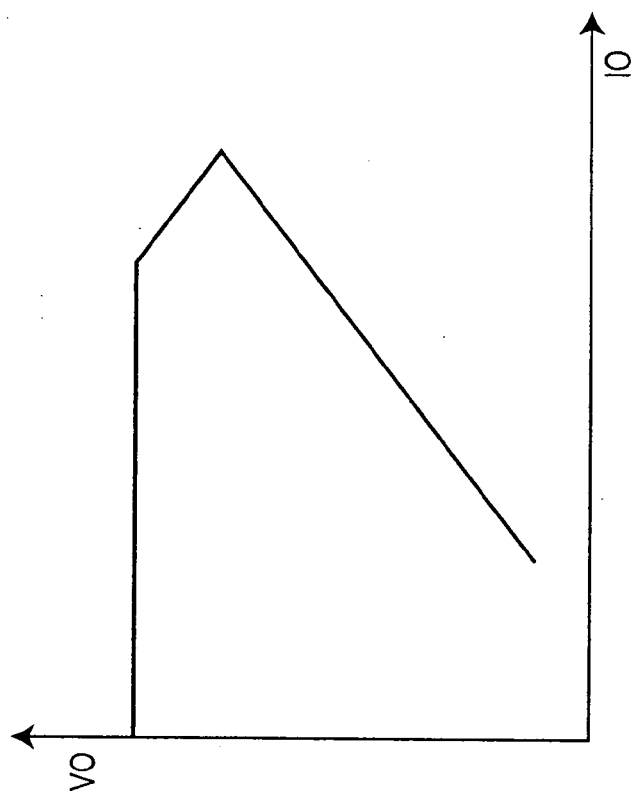
FIG. 8B describes the relationship between output voltage and output current in foldback current limiting overload protection.
Figure 8A:
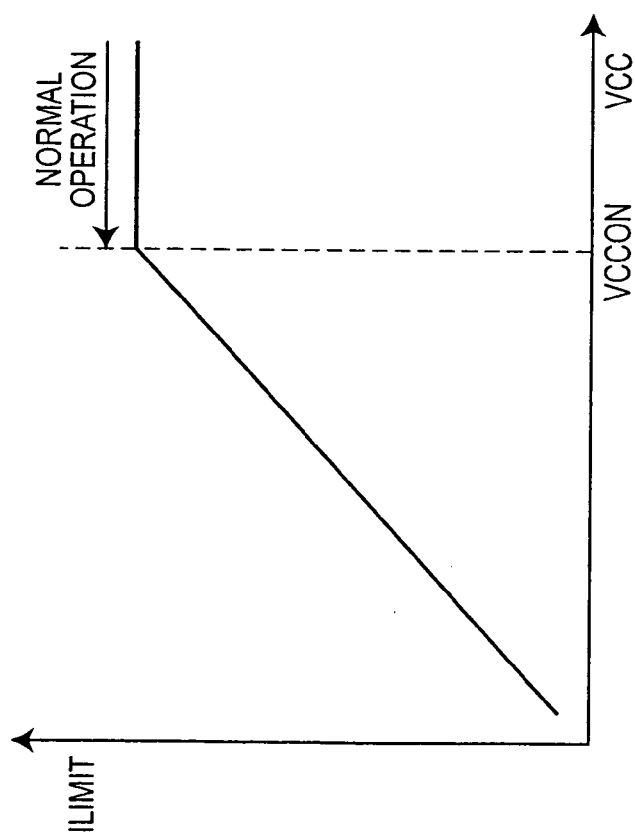
FIG. 8A describes the relationship between the maximum current ILIMIT level of the drain current peak and the CC pin voltage.

Alternatively to an intermittent oscillation arrangement affording auto-recovery overload protection by a drop in the CC pin voltage VCC, a foldback current limiting arrangement in which the output current IO drops as the output voltage VO drops during overload protection can be used. With a foldback current limiting arrangement current is supplied from the drain pin to the DD pin instead of from the CC pin when the CC pin voltage VCC drops to a predetermined level so that the power supply voltage VDD of the DD pin is held at a predetermined level even if the CC pin voltage VCC drops. In addition, by changing the ILIMIT reducing circuit 13 so that the maximum current ILIMIT drops as the CC pin voltage VCC drops when the CC pin voltage VCC drops to or below a predetermined level as shown in FIG. 8A, a foldback current limiting characteristic as shown in FIG. 8B can be achieved.

The power supplied to the output decreases when the CC pin voltage VCC drops in conjunction with the output voltage VO when an overload occurs, but the overcurrent problem of the overload state is solved. Normal operation is resumed when the output voltage VO and CC pin voltage VCC rise again. As a result, auto-recovery overload protection can be provided.

Furthermore, by adding a function for lowering the oscillation frequency of the pulse generating circuit 16 when the CC pin voltage VCC further decreases to an even lower level, the supply of energy to the output in an overload state can be further reduced, and even safer foldback current limiting overload protection can be provided.

Furthermore, the foldback current limiting arrangement is not limited to reducing the maximum current ILIMIT according to a drop in the CC pin voltage VCC, and other arrangements, such as lowering the oscillation frequency fosc, can be used insofar as the energy supplied to the output is reduced.

In the first embodiment of the invention the semiconductor device 3 has a function for latching off when current exceeding a predetermined level flows to the DD pin (the rated voltage pin), and enables latch-off overload protection by inserting a potential difference detection circuit 91 between the CC pin and DD pin, but an intermittent timer based or other type of auto-recovery overload protection can be used instead.

Furthermore, by providing the semiconductor device 3 with a function (ILIMIT reducing circuit 13) causing the maximum current ILIMIT to drop when the CC pin voltage VCC goes to or below a predetermined level, this first embodiment of the invention reduces the difference between the maximum output current IOMAX enabling rated voltage control and the output current IOPRT when the overload protection operates as a result of a drop in the smoothed voltage (CC pin voltage VCC) of the auxiliary coil 31c. The relationship between the change in CC pin voltage VCC and maximum current ILIMIT is not limited to the proportional relationship shown in FIG. 5 if the maximum current ILIMIT decreases linearly to the drop in the CC pin voltage VCC.

Furthermore, the CC pin voltage VCC at which the maximum current ILIMIT decreases is oscillation-enabling voltage VCCON above, but the CC pin voltage VCC at which the maximum current ILIMIT decreases is not limited to oscillation-enabling voltage VCCON and only needs to be greater than the oscillation-disabling voltage VCCOFF of the CC pin that triggers overload protection.

Yet further, other arrangements that can reduce the energy supply to the output when the CC pin voltage VCC drops to or below a predetermined level, such as lowering the oscillation frequency fosc, can be used if there is no function for reducing the maximum current ILIMIT as the CC pin voltage VCC drops.

The first embodiment of the invention has a feedback unit 30 for adjusting the FB pin current by the shunt regulator 45 and photocoupler 32 to adjust the drain current peak IDP, but the arrangement of the feedback unit 30 is not so limited. More particularly, the feedback unit 30 could use a zener diode instead of a shunt regulator.

The first embodiment of the invention using the semiconductor device 3 shown in FIG. 2 has a pulse generating circuit 16 and provides overload protection for a PWM control power supply that oscillates at a predetermined frequency, but other control methods, such as a self-excited ringing choke converter, can be used if the output power of the power supply increases linearly to the drain current peak IDP even if the frequency is not constant.

When the drain current peak IDP of the drain current exceeds a predetermined level with PWM control, the energy supplied to the output by the switching operation of the switching device 1 and primary coil 31a rises above a predetermined level. The first embodiment shown in FIG. 2 thus has a function that causes overload protection to operate when the supplied energy exceeds a predetermined level, and by setting a peak level for this supplied energy has a function that causes overload protection to operate when the smoothed voltage of the auxiliary coil 31c decreases to a predetermined level when the load increases.

If there is a function for detecting an overload when the energy supplied to the output exceeds a predetermined level due to the switching operation of the switching device 1 and primary coil 31a, the parameter used to monitor the supplied energy is not limited to the drain current peak IDP. The time TON that the switching device 1 enables current to flow during one switching period can be used instead. In this case the oscillation signal generating unit includes a target signal generating unit for generating the target signal S12 denoting the desired on time of the switching operation based on the DC output voltage VO, and generates the oscillation signal S17 based on this target signal S12. The target signal generating unit sets the upper target limit ILIMIT based on auxiliary DC voltage VCC, and limits the target signal S12 to this upper target limit ILIMIT or below.

If pulse frequency modulation (PFM) control is used to very the oscillation frequency while holding the drain current peak IDP constant is used, the energy supplied to the output can be monitored using the oscillation frequency fosc if the oscillation frequency fosc is substituted for the drain current peak IDP. In this case the oscillation signal generating unit includes a target signal generating unit for generating the target signal S12 denoting the target frequency of the switching operation based on the DC output voltage VO, and generates the oscillation signal S17 based on this target signal S12. The target signal generating unit sets the upper target limit fLIMIT based on auxiliary DC voltage VCC, and limits the target signal S12 to this upper target limit fLIMIT or below.

The first embodiment of the invention uses a semiconductor device 3 having the switching device 1 and control unit 2 on the same substrate, but the switching device 1 and control unit 2 can be rendered on different semiconductor substrates.

Second Embodiment

This second embodiment of the invention is described below primarily with reference to the differences to the first embodiment and variations thereof. Other aspects of the arrangement, operation, and effect of this first variation are identical to the first embodiment, and further description thereof is omitted.

Figure 9:
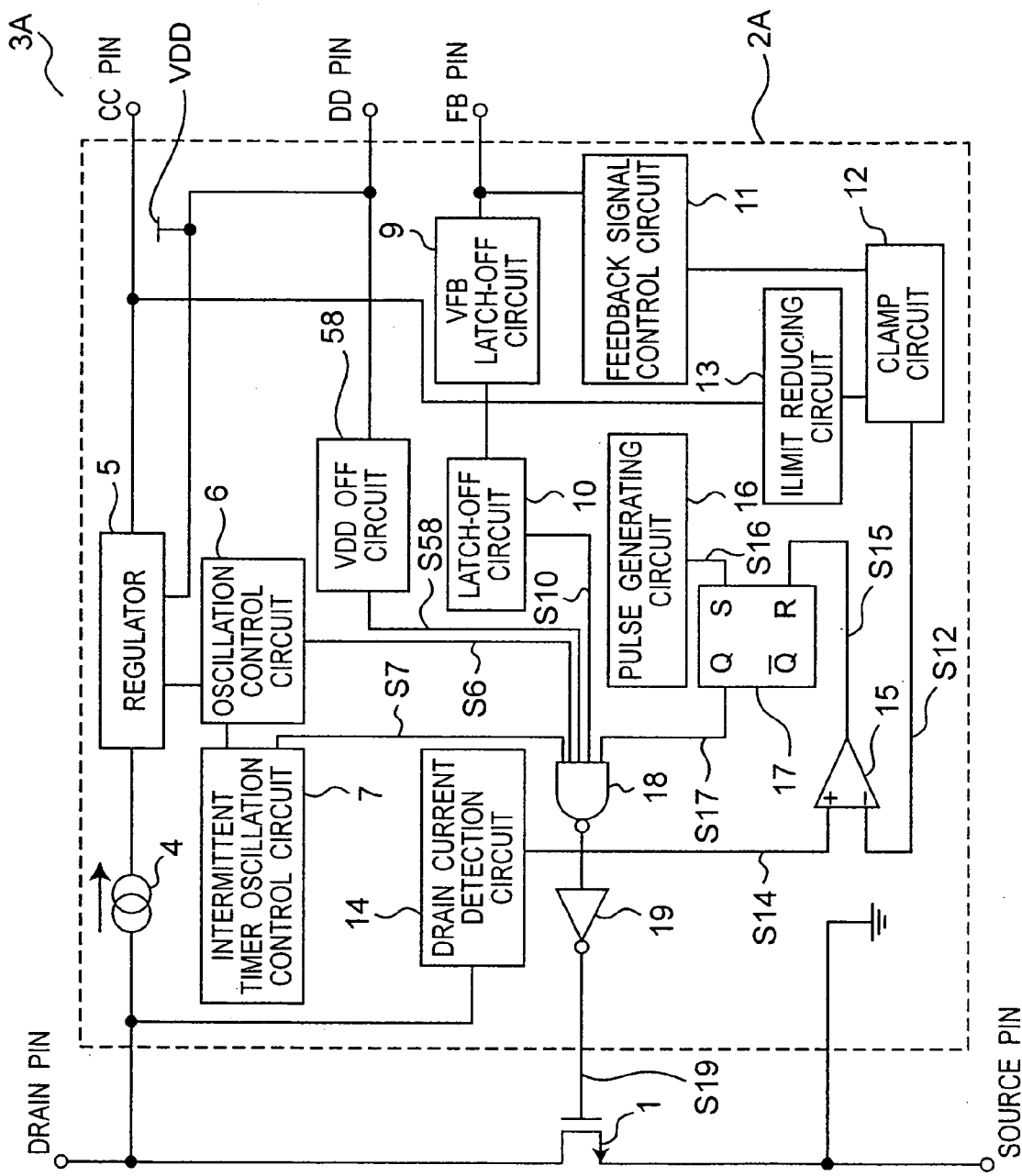
FIG. 9 is a block diagram of a semiconductor device providing auto-recovery overload protection according to a second embodiment of the invention.

The switching power supply device according to this second embodiment of the invention differs from the second variation of the first embodiment (FIG. 6) in using a semiconductor device 3A affording auto-recovery overload protection instead of semiconductor device 3. FIG. 9 is a block diagram showing a preferred arrangement of the semiconductor device 3A according to this second embodiment. The semiconductor device 3A is composed of a control unit 2A for controlling the switching device 1 and the switching operation of the switching device 1.

This semiconductor device 3A uses VDD off circuit 58 instead of the VDD latch-off circuit 8 of the semiconductor device 3 shown in FIG. 2. The VDD off circuit 58 sets the oscillation control signal S58 output to the NAND 18 to a LOW level signal only when current exceeding a predetermined level flows to the DD pin. As a result, the switching device 1 is set to the oscillation-disabled state and the switching device 1 is turned off when current flows to the DD pin and an overload is detected. After oscillation stops and the CC pin voltage VCC drops to oscillation-disabling voltage VCCOFF, intermittent operation is enabled by the rise and fall of the CC pin voltage VCC. The VDD off circuit 58 is included in the oscillation control signal generating unit.

Figure 10:
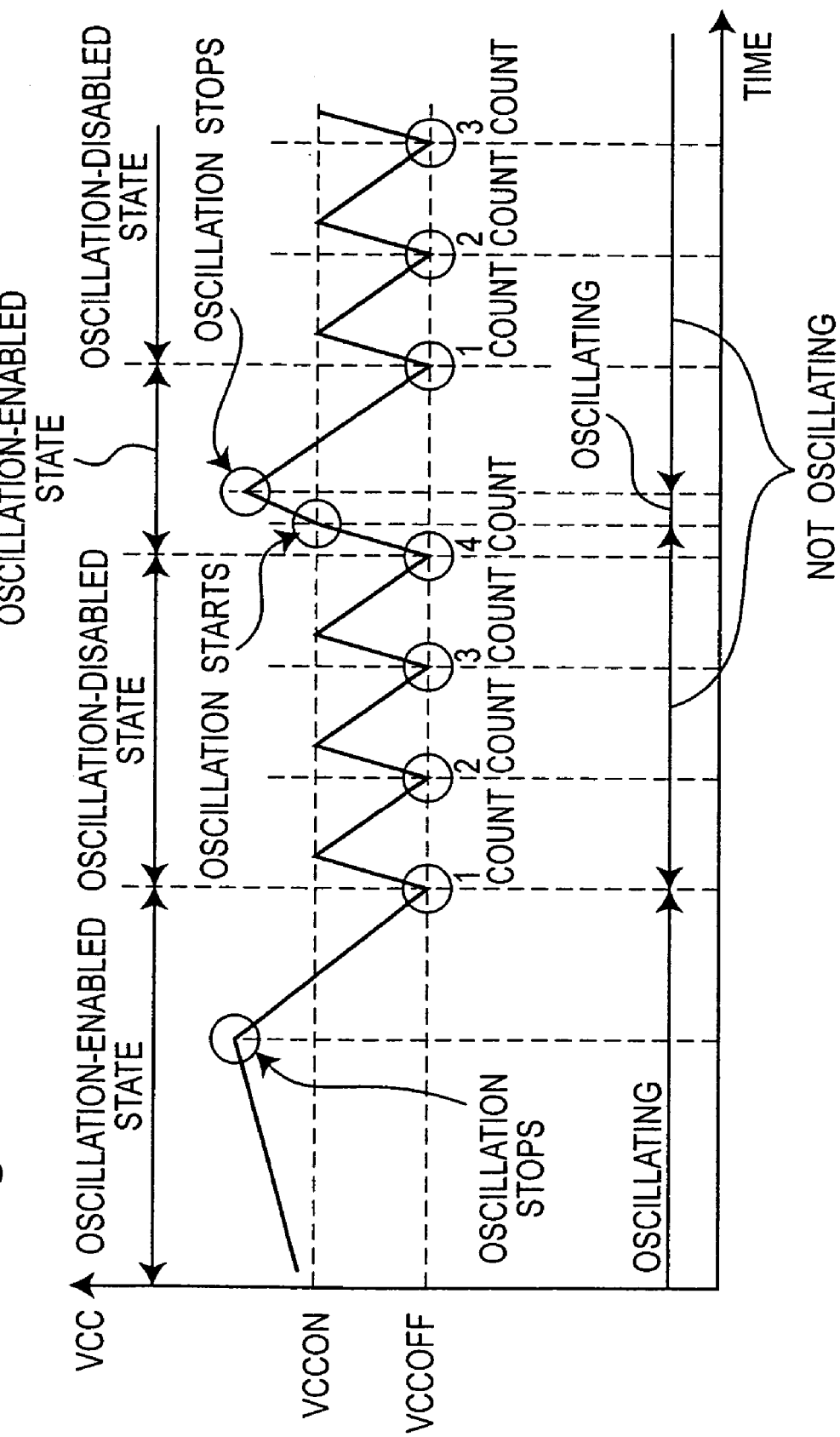
FIG. 10 is a timing chart showing the intermittent oscillation operation of the semiconductor device according to the second embodiment of the invention.

When CC pin voltage VCC drops to oscillation-disabling voltage VCCOFF, the output signal of the VDD off circuit 58 is reset from LOW to HIGH. FIG. 10 is a timing chart of this intermittent operation. Once oscillation stops, the CC pin voltage VCC continues to rise and fall. Oscillation remains stopped until the CC pin voltage VCC drops to oscillation-disabling voltage VCCOFF four times. Oscillation resumes when CC pin voltage VCC rises to oscillation-enabling voltage VCCON the fourth time.

If the overload condition remains when oscillation resumes, CC pin voltage VCC continues to rise and current flows to the DD pin again. The switching device 1 therefore stops oscillating again. Auto-recovery overload protection with intermittent operation is thus enabled by repeating this operation.

This second embodiment of the invention uses semiconductor device 3A (FIG. 9) in the switching power supply device (FIG. 6) according to the second variation of the first embodiment, and inserts a potential difference detection circuit 91 between the CC pin and DD pin to detect an overload, but the pin used for comparison with the CC pin voltage VCC can be any rated voltage pin and is not limited to the DD pin. For example, if a different rated voltage pin is available, overload protection can be provided by detecting if current flows to the rated voltage pin or the pin voltage rises.

By providing the semiconductor device 3A with a function (ILIMIT reducing circuit 13) causing the maximum current ILIMIT to drop when the CC pin voltage VCC goes to or below a predetermined level, this second embodiment of the invention reduces the difference between the maximum output current IOMAX enabling rated voltage control and the output current IOPRT when the overload protection operates as a result of a drop in the smoothed voltage (CC pin voltage VCC) of the auxiliary coil 31c. The relationship between the change in CC pin voltage VCC and maximum current ILIMIT is not limited to the proportional relationship shown in FIG. 5 if the maximum current ILIMIT decreases linearly to the drop in the CC pin voltage VCC.

In the second embodiment maximum current ILIMIT drops when CC pin voltage VCC goes to or below oscillation-enabling voltage VCCON. However, the CC pin voltage VCC at which the maximum current ILIMIT decreases is not limited to oscillation-enabling voltage VCCON and only needs to be greater than the oscillation-disabling voltage VCCOFF of the CC pin that triggers overload protection.

Yet further, other arrangements that can reduce the energy supply to the output when the CC pin voltage VCC drops to or below a predetermined level, such as lowering the oscillation frequency fosc, can be used if there is no function for reducing the maximum current ILIMIT as the CC pin voltage VCC drops.

A function enabling the current consumption of the CC pin to rise when the CC pin voltage VCC goes to or below a predetermined level can be added even if the maximum current ILIMIT does not drop together with the CC pin voltage VCC when the CC pin voltage VCC decreases to or below a predetermined level. In other words, when CC pin voltage VCC goes to or below a predetermined level, the internal resistance of the auxiliary power supply unit 20 decreases and current consumption between the CC pin and DD pin increases. As a result, the difference between the maximum output current IOMAX that accelerates the drop in CC pin voltage VCC and enables rated voltage control and output current IOPRT when overload protection operates due to a drop in the smoothed voltage (CC pin voltage VCC) of the auxiliary coil 31c can be reduced. Providing both of these functions further enhances the effect.

Third Embodiment

This third embodiment of the invention is described primarily with reference to the differences to the first and second embodiments. Other aspects of the arrangement, operation, and effect of this embodiment are identical to the first and second embodiments, and further description thereof is omitted.

Figure 11:
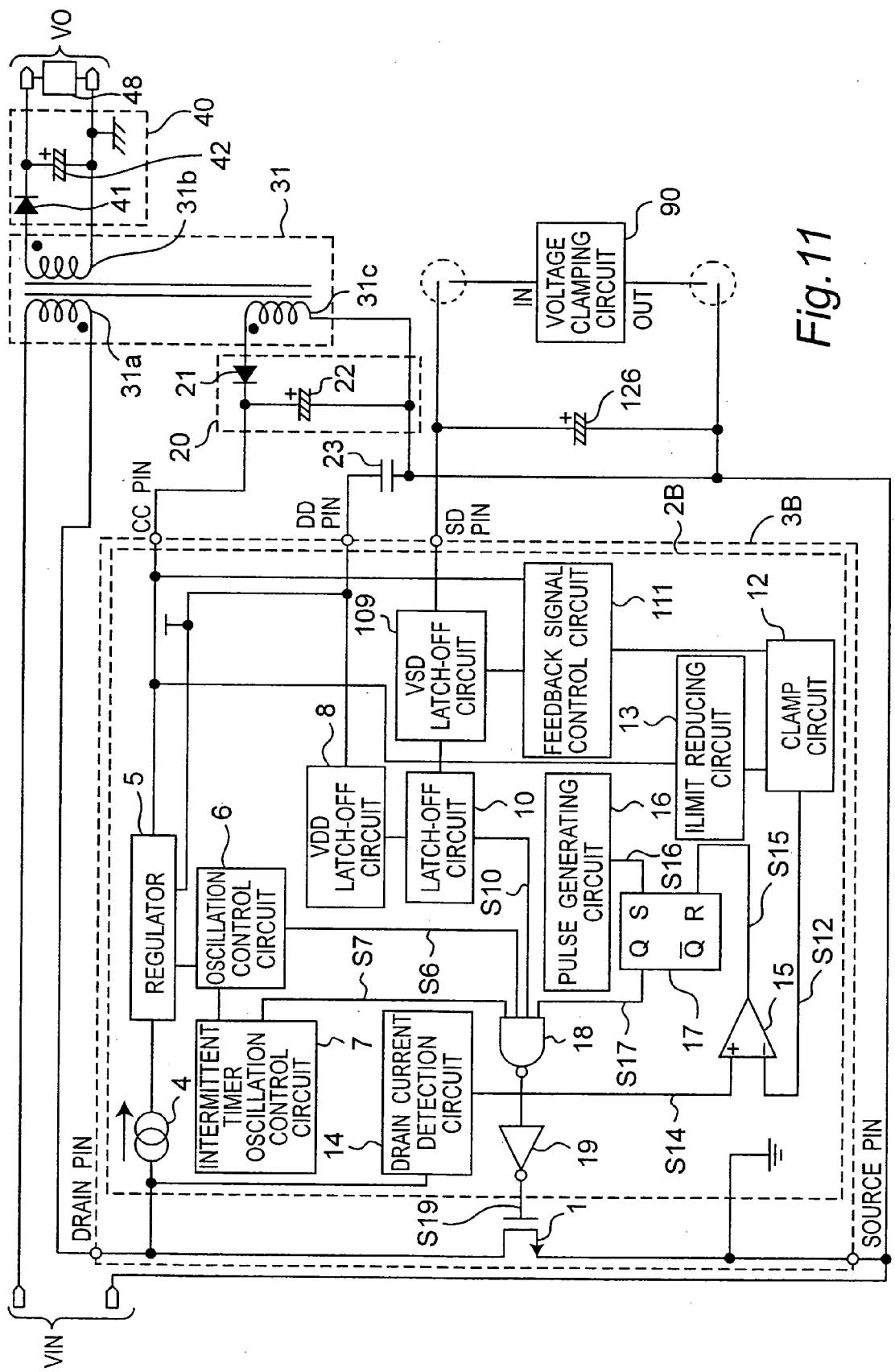
FIG. 11 is a block diagram of a semiconductor device providing auto-recovery overload protection according to a third embodiment of the invention.
Figure 12:
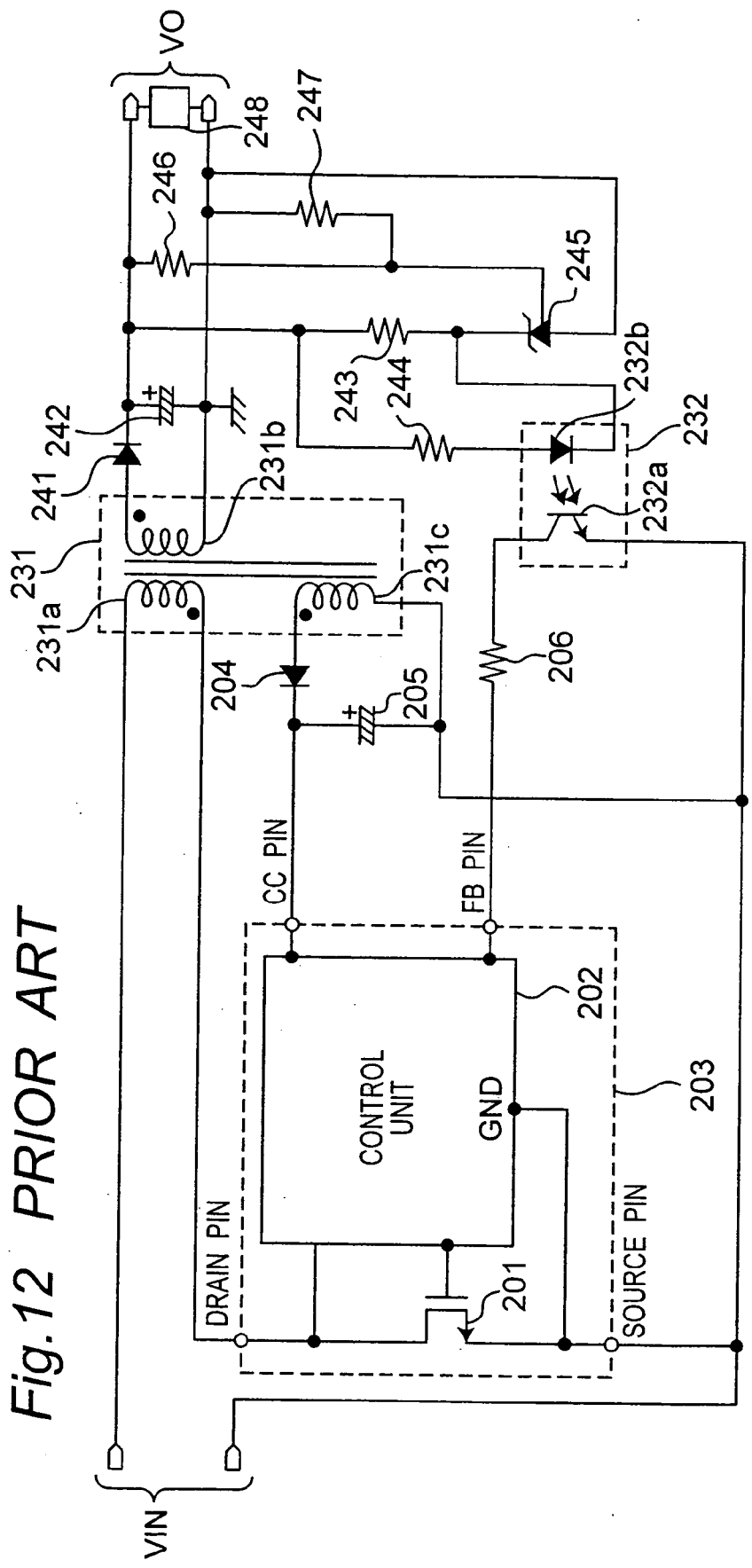
FIG. 12 is a block diagram showing the arrangement of a conventional switching power supply device.
Figure 13A:
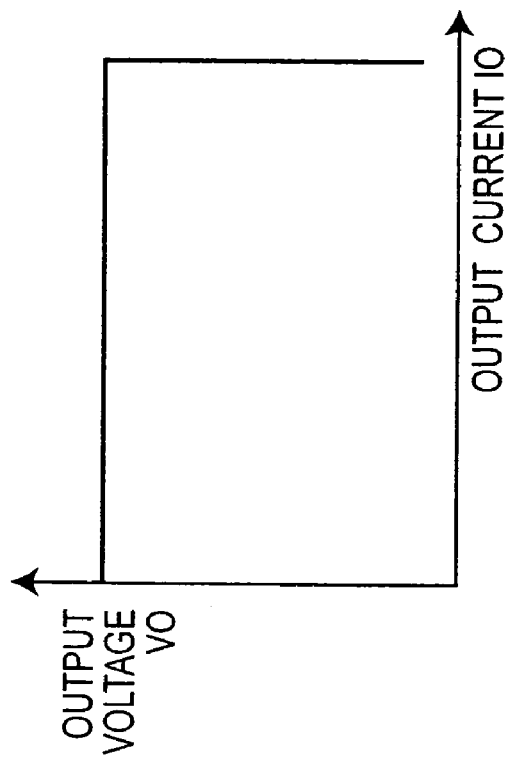
FIG. 13A describes foldback current limiting overload protection using a conventional switching power supply device.
Figure 13B:
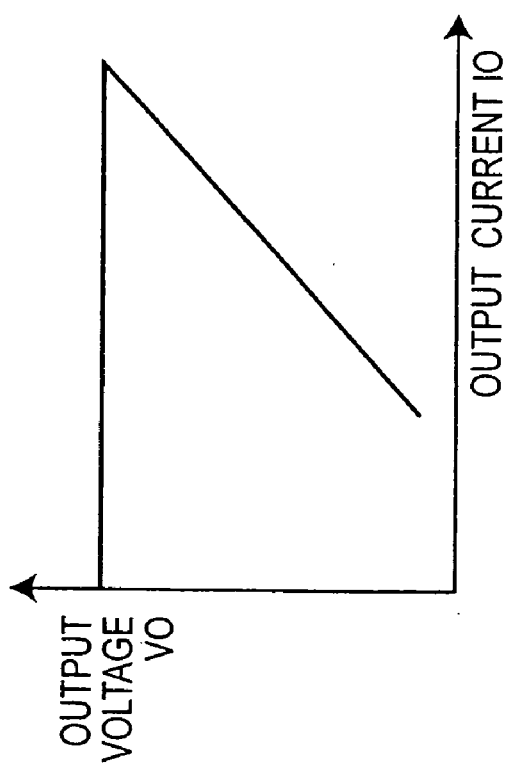
FIG. 13B describes current drop-off overload protection using a conventional switching power supply device.

FIG. 11 is a block diagram of a switching power supply device according to a third embodiment of the invention. Auxiliary coil feedback adjusts the energy supplied to the output so that the smoothed voltage (CC pin voltage VCC) of the auxiliary coil 31c goes to a predetermined level, and thus enables rated voltage operation. This auxiliary coil feedback drives the CC pin voltage VCC to a specific level, and overload detection based on a rise in CC pin voltage VCC is therefore not possible. However, two types of overload protection can be achieved by minimal circuit modification by detecting an overload when the peak current flowing to the switching device 1 exceeds a predetermined level and detecting an overload when the smoothed voltage of the auxiliary coil 31c drops below a predetermined level. This third embodiment uses semiconductor device 3B instead of semiconductor device 3 in the first embodiment of the invention. This semiconductor device 3B is composed of a control unit 2B that controls the switching device 1 and the switching operation of the switching device 1.

The third embodiment of the invention shown in FIG. 11 differs from the switching power supply device of the first embodiment of the invention shown in FIG. 1 in two ways. First, the CC pin voltage VCC is input to feedback signal control circuit 111 to set the drain current peak IDP. Second, VSD latch-off circuit 109 is used instead of VFB latch-off circuit 9, and the feedback signal control circuit 111 outputs to the VSD latch-off circuit 109. When drain current peak IDP exceeds a predetermined level, the VSD latch-off circuit 109 passes current to capacitor 126, and latches off switching device 1 oscillation when SD pin voltage VSD goes to predetermined voltage VSDOLP. This predetermined voltage VSDOLP is also called the feedback voltage.

The SD pin voltage VSD is also called a feedback voltage. The feedback signal control circuit 111 is included in the target signal generating unit. The VSD latch-off circuit 109 is included in the oscillation control signal generating unit. The feedback signal generating unit includes transformer 31, auxiliary power supply unit 20, feedback signal control circuit 111, VSD latch-off circuit 109, and capacitor 126. When SD pin voltage VSD exceeds feedback voltage VSOLP, the VSD latch-off circuit 109 and latch-off circuit 10 set the oscillation control signal S10 to the stop state level. When the oscillation control signal S10 is at the stop state level, the oscillation control signal generating unit holds the stop state level even if SD pin voltage VSD goes below feedback voltage VSOLP. The oscillation signal generating unit generates oscillation signal S17, which goes periodically between the operating state level and the non-operating state level, based on the CC pin voltage VCC, and switches the switching device 1 based on oscillation signal S17.

When the voltage clamping circuit 90 shown in FIG. 11 is not connected, drain current peak IDP exceeds a predetermined level when an overload occurs, and SD pin voltage VSD rises to predetermined voltage VSDOLP, overload protection operates in a latch-off mode. When voltage clamping circuit 90 is connected between the SD pin and source pin and an overload occurs, SD pin voltage VSD is clamped before rising to predetermined voltage VSDOLP and does not latch off. The output voltage VO therefore drops and CC pin voltage VCC drops because drain current peak IDP is limited to maximum current ILIMIT. As in the switching power supply device (FIG. 3) in the first variation of the first embodiment, auto-recovery overload protection with intermittent oscillation can therefore be achieved. More specifically, the arrangement of the third embodiment shown in FIG. 11 enables selecting latch-off overload protection or auto-recovery overload protection depending on whether or not voltage clamping circuit 90 is added.

This third embodiment of the invention can be rendered with the voltage clamping circuit 90 included in the feedback signal generating unit or not included. When the voltage clamping circuit 90 is not included in the feedback signal generating unit, the feedback signal generating unit lowers the auxiliary DC voltage VCC substantially proportionally to the DC output voltage VO as the DC output voltage VO drops, and generates the feedback voltage VSD to rise as the auxiliary DC voltage VCC drops.

If the voltage clamping circuit 90 is included in the feedback signal generating unit, the oscillation control signal generating unit does not set the oscillation control signal S10 to the stop state level.

If the load decreases and the output voltage VO increases in a normal load state, the auxiliary DC voltage VCC that is substantially proportional to the output DC voltage VO also rises, current flow from the SD pin rises, target signal S12 drops, and oscillation signal S17 is generated so that the drain current peak IDP drops.

Conversely, if the load increases and the output voltage VO decreases in a normal load state, the auxiliary DC voltage VCC also decreases, current flow from the SD pin drops, target signal S12 rises, and oscillation signal S17 is generated so that the drain current peak IDP rises.

Because variation in the drain current peak IDP thus works to cancel variation in the output voltage VO, the output voltage VO is stabilized regardless of load variations under normal load conditions. The current flowing from the SD pin is also called a feedback current.

By using a single type of switching power supply device IC (semiconductor device), the present invention enables selecting auto-recovery or latch-off type overload protection by slightly modifying peripheral circuits added to the semiconductor device. In addition, by adding a simple circuit to a separate part, the output power at which overload protection operates can be set by the peripheral circuits added to the semiconductor device instead of by the semiconductor device; The general utility of the semiconductor device (control IC) for the switching power supply device can thus be improved, and a semiconductor device that meets the needs of more power supply device designers can be provided.

Furthermore, selecting the overload protection arrangement is afforded by adding very few parts, and therefore results in a very slight cost increase.

Yet further, the ability to use a single semiconductor device for a wider range of applications eliminates the need to maintain a variety of semiconductor devices only to afford different types of overload protection, and the semiconductor device development cost can be greatly reduced.

Yet further, by rendering a function causing the maximum current ILIMIT to drop when the CC pin voltage VCC goes below a predetermined level, the difference between the maximum output current IOMAX enabling rated voltage control and the output current IOPRT at which overload protection operates due to a drop in the smoothed voltage (auxiliary supply voltage VCC) of the auxiliary coil can be reduced. Cost can therefore be reduced because the current rating of the power supply components can be reduced.

Furthermore, because overload protection operates when current exceeding a predetermined level flows to the rated voltage DD pin, overload protection can be applied using the rise in the smoothed voltage of the auxiliary coil. As a result, the output power at which overload protection operates can be set by the potential difference detection circuit 91 between the CC pin and DD pin. This enables setting the output power at which overload protection operates more easily than by the transformer design alone.

A semiconductor device and switching power supply device according to the present invention can be used in devices that require either auto-recovery or latch-off overload protection, and can therefore be used in a wide range of electronic devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A switching power supply device comprising:
   a transformer having a primary coil, a secondary coil, and an auxiliary coil;
   a switching device that switches to control a first DC voltage input to the primary coil;
   an output voltage generating unit operable to generate a second DC voltage as an output voltage by rectifying and smoothing the AC voltage generated in the secondary coil as a result of the switching operation of said switching device;
   a first external connection pin which is disposed to a control circuit operable to control the switching operation of said switching device, and to which is input the rectified and smoothed voltage level of the AC voltage of the auxiliary coil proportional to the secondary coil;
   a first detector operable to detect an overload when an energy supplied to said output voltage generating unit becomes greater than or equal to a first predetermined level;
   a second detector operable to have a maximum value set for the energy supplied to said output voltage generating unit, and to detect an overload when the voltage of said first external connection pin becomes less than or equal to a second predetermined level;
   a second external connection pin of which a voltage increases when an energy supplied to said output voltage generating unit becomes greater than or equal to a third predetermined level;
   a first overload protector operable to be applied when said first detector detects the overload; and
   a second overload protector operable to be applied when said second detector detects the overload,
   wherein said first detector detects the overload when the voltage of said second external connection pin increases to a fourth predetermined level which is above a normal operating voltage under which no overload is detected, and
   said second overload protector is made operative and said first overload protector is made inoperative by connecting said second external connection pin to a voltage clamping circuit operable to prevent the voltage of said second external connection pin from increasing to the fourth predetermined level.

2. The switching power supply device described in claim 1, wherein a maximum level of an energy supplied to said output voltage generating unit from said transformer as a result of the switching operation of said switching device decreases when the voltage which is input to said first external connection pin becomes less than or equal to a fifth predetermined level above a voltage in which said control circuit applies overload protection in cases where a function circuit having a preselected function is connected to said first detector, and said first detector does not detect the overload and said second detector detects the overload.

3. The switching power supply device described in claim 1, wherein said first detector of said control circuit detects that an energy supplied to said output voltage generating unit becomes greater than or equal to the first predetermined level when a peak value of a current flowing said switching device becomes greater than or equal to a sixth predetermined level; and said second detector of said control circuit has a maximum value set for the peak value of the current flowing said switching device, and detects the overload when the voltage which is input to said first external connection pin, becomes less than or equal to the second predetermined level.

4. The switching power supply device described in claim 1 wherein said control circuit controls an energy supplied to said output voltage generating unit from said transformer as a result of the switching operation of said switching device with the control being carried out based on a pulse frequency modulation control that holds a peak value of a current flowing said switching device to a seventh predetermined level and that controls a frequency of the switching operation of said switching device;

said first detector detects that an energy supplied to said output voltage generating unit becomes greater than or equal to the first predetermined level when the frequency of the switching operation of said switching device becomes greater than or equal to an eighth predetermined level; and said second detector has a maximum value set for the frequency of the switching operation of said switching device, and detects the overload when the voltage which is input to said first external connection pin, becomes less than or equal to a ninth predetermined level.

5. The switching power supply device described in claim 1, wherein said control circuit controls an energy supplied to said output voltage generating unit from said transformer as a result of the switching operation of said switching device based on pulse width modulation control.

6. The switching power supply device described in claim 1, wherein said control circuit controls an energy supplied to said output voltage generating unit from said transformer as a result of the switching operation of said switching device by a ringing choke converter.

7. The switching power supply device described in claim 1, wherein said switching device is included in a substrate with said control circuit.

8. The switching power supply device described in claim 1, wherein said voltage clamping circuit includes a zener diode.

9. A switching power supply device configured to convert a DC input voltage to a DC output voltage, comprising:

a switching arrangement configured to switch the DC input voltage;

a transformer arrangement configured to produce an AC output voltage and an auxiliary AC voltage based on the switched DC input voltage;

a DC output voltage generator configured to rectify the AC output voltage and to produce a DC output voltage;

an auxiliary DC voltage generator configured to rectify the auxiliary AC voltage and to produce an auxiliary DC voltage substantially proportional to the DC output voltage;

a controller configured to control the switching operation of said switching arrangement; and a feedback signal generator configured to generate a feedback voltage that rises as the DC output voltage falls, wherein said controller comprises an oscillation signal generator configured to generate an oscillation signal that repeatedly goes periodically to an operating state level and a non-operating state level based on the DC output voltage or auxiliary DC voltage, and to switch said switching arrangement based on the oscillation signal, and an oscillation control signal generator configured to generate an oscillation control signal at an oscillation state level that continues the oscillation signal or a stop state level that stops the oscillation signal, and sets the oscillation control signal to the stop state level to stop the switching operation of said switching arrangement when the auxiliary DC voltage is less than or equal to a predetermined first auxiliary voltage, wherein said oscillation control signal generator comprises a stop circuit configured to set the oscillation control signal to the stop state level when the feedback voltage is greater than or equal to a predetermined feedback voltage, wherein said feedback signal generator comprises a voltage clamping circuit includes a zener diode configured to limit the feedback voltage to less than the feedback voltage level, and wherein said oscillation control signal generator does not set the oscillation control signal to the stop state level.

10. The switching power supply device described in claim 9, wherein:

said controller switches said switching arrangement by pulse frequency modulation control.

11. The switching power supply device described in claim 9, wherein said controller switches said switching arrangement by pulse width modulation control.

12. The switching power supply device described in claim 9, wherein said controller switches said switching arrangement by a ringing choke converter.

* * * * *